US007904378B2

(12) United States Patent
Ghani et al.

(10) Patent No.: US 7,904,378 B2
(45) Date of Patent: Mar. 8, 2011

(54) AUCTION RESULT PREDICTION WITH AUCTION INSURANCE

(75) Inventors: Rayid Ghani, Chicago, IL (US); Hillery D. Simmons, Chicago, IL (US)

(73) Assignee: Accenture Global Services Limited (IE)

( * ) Notice: Subject to any disclaimer, the term of this patent is extended or adjusted under 35 U.S.C. 154(b) by 0 days.

(21) Appl. No.: 12/816,079

(22) Filed: Jun. 15, 2010

(65) Prior Publication Data

US 2010/0256999 A1 Oct. 7, 2010

Related U.S. Application Data

(63) Continuation of application No. 10/938,013, filed on Sep. 10, 2004, now Pat. No. 7,752,120, which is a continuation-in-part of application No. 10/867,597, filed on Jun. 14, 2004, now Pat. No. 7,752,119.

(51) Int. Cl.
*G06Q 40/00* (2006.01)
(52) U.S. Cl. .......................................................... 705/37
(58) Field of Classification Search ..................... 705/37
See application file for complete search history.

(56) References Cited

PUBLICATIONS

Ghani, R: Price Prediction and Insurance for Online Auctions, Aug. 21-24, 2005, KIDD'05, Chicago, IL, pp. 411-418.*
Accenture: Online Auction Price Insurance—Accenture prototype helps "insure" companies get their price, www.accenture.com, pp. 1-2.*
Wang et al: Explaining and Forecasting Online Auction Prices and their Dynamics using Functional Data Analysis, Dec. 2004, Journal of Business & Economics, pp. 1-17.*

* cited by examiner

*Primary Examiner* — Hani Kazimi
*Assistant Examiner* — Bijendra K Shrestha
(74) *Attorney, Agent, or Firm* — Brinks Hofer Gilson & Lione

(57) ABSTRACT

An auction result prediction system predicts auction results. The system may determine item, seller, or auction characteristics from prior or pending auctions. The system also obtains item characteristics of an item for which a result prediction is sought, either by a buyer or by a seller. A price predictor in the system accepts the auction and item characteristics and predicts an auction result based on the characteristics. The system also determines insurance parameters for insuring online auctions, and the insurance parameters may be based on predicted auction results. An insurance policy reflecting the insurance parameters may be offered to an online auction buyer, seller, or other market participant. The insurance policy may insure, for example, that an item for sale will obtain at least a price specified by the insurance policy.

27 Claims, 12 Drawing Sheets

AUCTION RESULT PREDICTION WITH AUCTION INSURANCE

CROSS REFERENCE TO RELATED APPLICATIONS

This application is a continuation of U.S. patent application Ser. No. 10/938,013, filed Sep. 10, 2004, titled Auction Insurance System, which is a continuation-in-part of U.S. patent application Ser. No. 10/867,597, filed Jun. 14, 2004, titled Auction Result Prediction. This application claims priority to and incorporates both U.S. patent application Ser. No. 10/867,597 and U.S. patent application Ser. No. 10/938,013 by reference in their entireties.

BACKGROUND

1. Technical Field

This application relates to data processing systems for predicting an auction result, as well as determining auction result insurance parameters. In particular, this application relates to data processing systems that predict an auction result that may include price ranges and confidence measures that specify a confidence in a corresponding price range, as well as determining an insured auction result and insurance cost for the insured auction result.

2. Background Information

Rapid technology growth in recent years has brought widespread Internet access into the homes of millions of individuals. As a result, those individuals have access to convenient online auction services provided by such companies as eBay, uBid, and Yahoo. The immense popularity of online auction services is evident in the hundreds of thousands of auctions running simultaneously at any given time for everything from new flat panel monitors to upright arcade videogames from the early 80's.

Whether the auction is an online auction or a traditional auction, sellers are faced with the challenge of obtaining a satisfactory price for their auction item. In the past, sellers either accepted whatever final price was reached for the auction item, or set a reserve price or opening price to match at least the satisfactory price. Accepting the final price often resulted in an auction item selling for less than the satisfactory price, while setting a reserve or opening price sometimes failed to attract any buyers at all.

Online marketplaces have become significant commercial entities. It is estimated that these marketplaces, such as EBAY, YAHOO! SHOPPING AUCTIONS, and AMAZON.COM AUCTIONS, will account for 25 percent of ecommerce by 2005. Even today, EBAY, one of the largest online marketplaces, typically offers 19 million items for sale at any given time. In 2003, $24 billion of goods were sold on EBAY, which maintained a $57 billion market value and had $2.4 billion in revenue. Although online marketplaces such as EBAY offer these individuals a unique opportunity to sell their goods, the value for any given item sold at auction is inherently hard to predict for several reasons.

First, the condition of items can differ in many different ways, regardless of how similar the items are to one another. Buyers may be willing to pay a premium for new or like-new items, while items that exhibit years of wear and tear may command a lower price. Second, most online auctions offer a variety of shipping options. For example, the buyer may have to pay all shipping costs, the seller may assume all shipping costs, or the buyer and seller may split shipping costs. Thus, the total payment due to a seller may not only include the final purchase price, but also all, none, or some of the cost of shipping the item. Third, most online marketplaces have established selling rating systems to provide transaction feedback and increase buyer confidence. The seller rating may affect the value of a winning bid since, for example, a highly rated seller may attract additional bids, while a lower rated seller may not receive as many.

Fourth, item descriptions for substantially identical items item may vary dramatically. For example, some sellers may include images of the item, while others may not. The value of a winning bid may vary with the effectiveness of the item description, including the presence or absence of images. Fifth, each auction begins and ends at specified times. When coupled with the fact that 15% of auctions are won in the last minute, the timing of an auction can play a factor in the value of the winning bid. For example, the same item may command a higher premium at an auction that ends at 3:00 PM as opposed to an auction 3:00 AM. The difficulties in predicting the auction outcome may discourage both buyers and sellers from entering the online market. Among other concerns, sellers may not want to risk low winning bids, and buyers may not want to risk the silent bidding process that chases the item cost ever higher In the past, few if any tools were available to analyze auctions. For example, the Andale.com website, created by Andale, Inc. of Mountain View, Calif., determines average item selling prices based on past auction data. Simple price averaging may provide a crude price approximation, but, based on price information alone, it is a relatively inaccurate estimator.

Accordingly, a need has long existed for methods and systems that may accurately predict an auction result and provide auction result insurance.

BRIEF SUMMARY

An auction result prediction system and method predict auction results. The analysis system may retrieve, obtain, or derive item, seller, or auction characteristics from prior or pending auctions. The system also may obtain, retrieve, or derive item characteristics of an item for which a result prediction is sought, either by a buyer or by a seller. The system may include a price prediction program that accepts the auction and item characteristics and that predicts a result based on one or more of the characteristics.

The auction result prediction method may include obtaining a seller-input characteristic for an auction item, obtaining historical auction data related to the auction item, and providing the seller-input characteristic and the historical auction data to a result prediction program. The result prediction program may return an end-of-auction price, an end-of-auction price range, an end-of-auction price threshold, or other result predictions.

An auction result prediction system may include a processor, a memory, and a result predictor. The memory may store auction characteristics such as those directly specified by a seller or a buyer for any given item. The memory may also store historical auction characteristics for similar auction items. The result predictor may include circuitry or logic that accepts the buyer or seller specified auction characteristics and the historical characteristics and that provides one or more predicted auction results.

The method and system may also determine auction insurance parameters and insured online auctioning. In determining auction insurance parameters, a predicted auction result for an auction item may be obtained, the predicted auction result may be provided to an insurance parameter determination program, and auction insurance parameters received from the insurance parameter determination program may be stored in a memory. The predicted auction result may be a predicted end-of-auction price for an auction item, a confidence measure for the predicted auction result, a distribution of prices, or other results.

The system may further provide insured online auctions that include a memory that stores online auction submission page data. The page data may include seller-specified auction item characteristics, such as auction item title, auction item location, or other characteristics; an insurance selector, such as a checkbox that may be selected or de-selected; and an auction insurance parameter, such as an insured end-of-auction price or an insurance cost.

The system may also include a network connection, a result predictor and a processor coupled to the memory and the network connection. The processor may transmit the online auction submission page data to a seller. In response to an auction submission instruction from the seller, the processor may communicate acceptance of the auction insurance parameters to an insurer.

DETAILED DESCRIPTION

As an initial matter, although the description below proceeds with reference to auction result prediction for personal digital assistants (PDAs) offered for sale in an online marketplace, the price prediction technology may be applied to auction result prediction for any type of goods or services bought or sold in any type of auction marketplace. The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as stored in program, data, or multipurpose system memories, all or part of systems and methods consistent with the price prediction technology may be stored on or read from other machine-readable media, for example, secondary storage devices such as hard disks, floppy disks, and CD-ROMs; electromagnetic signals; or other forms of machine readable media either currently known or later developed.

Furthermore, although specific components of price prediction technology are described and illustrated, methods, systems, and articles of manufacture consistent with the price prediction technology may include additional or different components. For example, a processor may be implemented as a microprocessor, microcontroller, application specific integrated circuit (ASIC), discrete logic, or a combination of other types of circuits acting as explained above. Databases, tables, and other data structures may be separately stored and managed, incorporated into a single memory or database, or generally logically and physically organized in many different ways according to many different file types, file structures, or file standards. The programs discussed below may be parts of a single program, separate programs, or distributed locally or remotely across several memories and processors. For example, the price prediction system may be wholly or partly implemented on a home personal computer, at an auction web server, a third-party server, or at one or more other locations.

Figure 1:
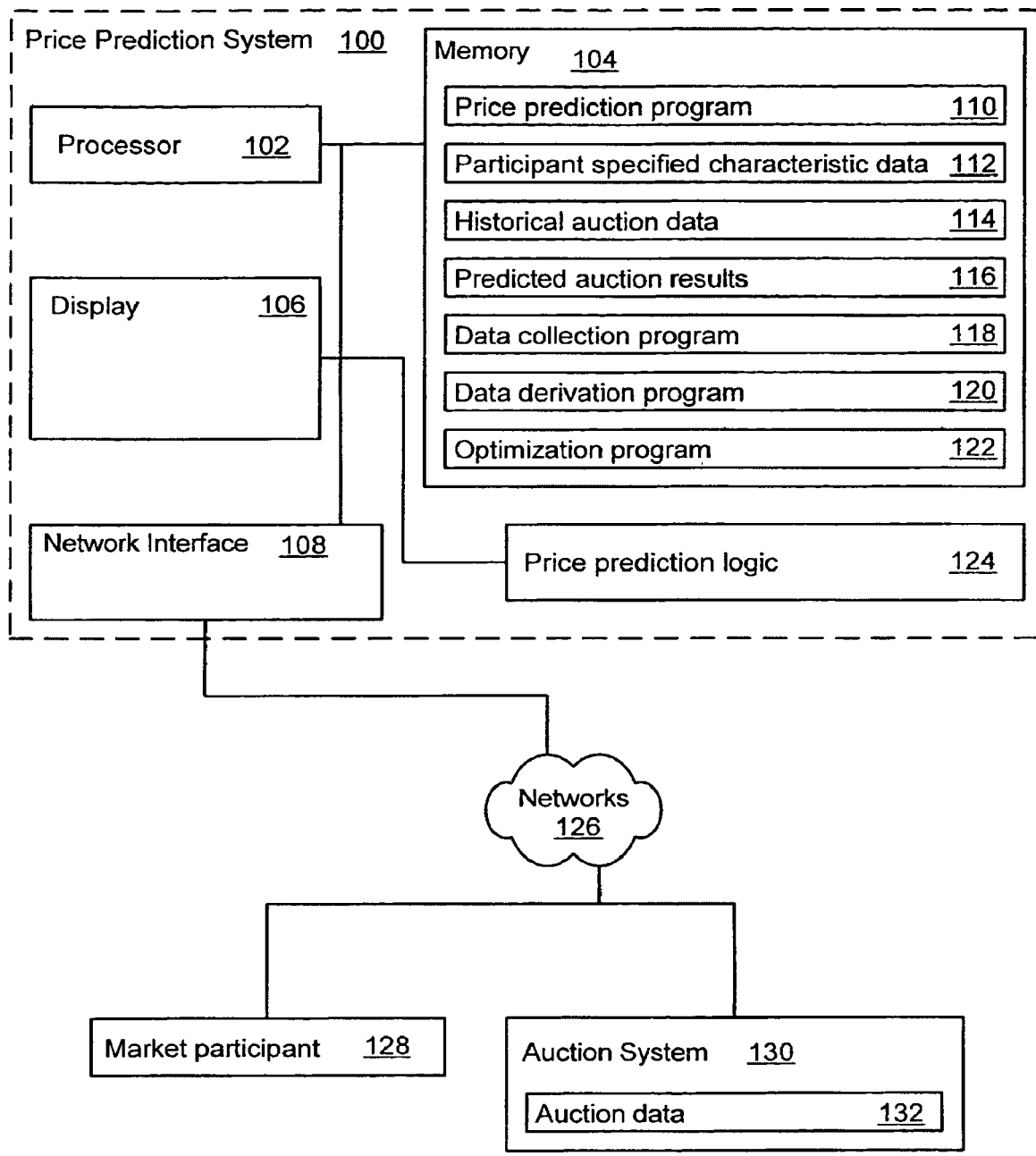
FIG. 1 shows an auction result prediction system.

FIG. 1 shows a price prediction system 100. The price prediction system 100 may include a processor 102, a memory 104, and a display 106. In addition, a network interface 108 may be present.

The memory 104 may store a price prediction program 110, participant item-characteristic data 112, and historical auction data 114. In addition, the memory 104 may store predicted auction results 116, as well as a data collection program 118, data derivation program 120, and an optimization program 122.

Result prediction logic 124 or circuitry may also be present in the price prediction system 100. The result prediction logic 124 may be hardware and/or software separate from or integrated with the processor 102 and memory 104 that predicts auction results. For example, the result prediction logic 124 may implement a stand alone neural network. The price prediction logic 124 and the price prediction program 110 are examples of price predictors that the system 100 may employ to generate predicted auction results. In other words, while the price prediction program 110 is one form of a price predictor (and may itself implement neural network processing in software), the price prediction system is not limited to using a program in the memory 104 for auction result prediction.

The network interface 108 may include a network interface card or other network connection device to connect the price prediction system 100 to internal or external networks 126. The networks 126 may connect to one or more market participants 128 and auction systems 130. The market participants 128 may represent, for example, the personal computers of buyers and sellers engaged in online auctions, or other interested parties. The auction systems 130 may represent an online auction service such as Ebay or Yahoo. The auction systems 130 may maintain auction data 132 for their past and present auctions. The auction data 132 may include auction title, selling price, shipping costs, seller identification, and many other parameters such as those explained below.

Figure 2:
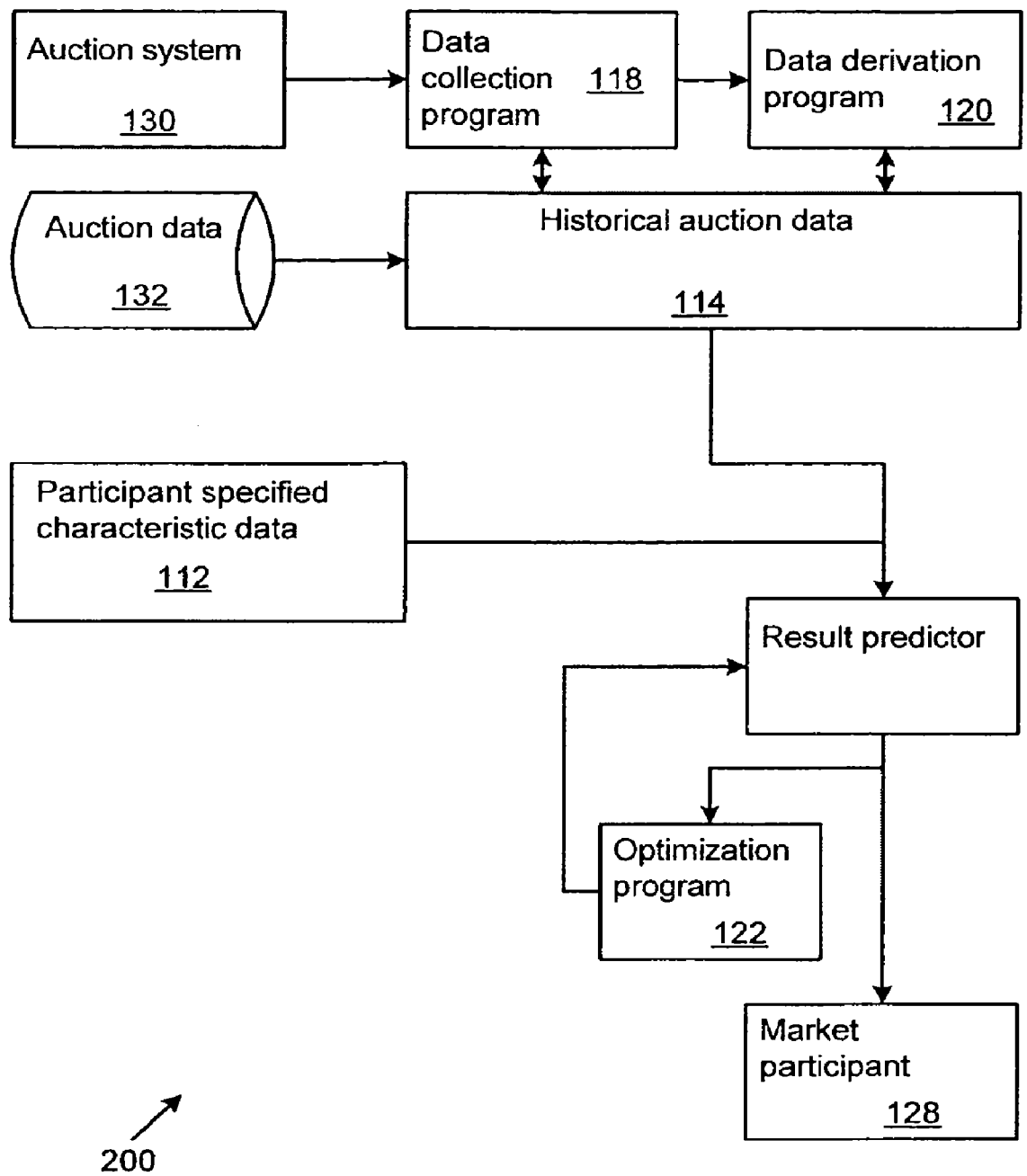
FIG. 2 shows data flow in the auction result prediction system.

Turning briefly to FIG. 2, a data flow diagram 200 summarizes the movement of data through the system 100. The elements illustrated in FIG. 2 are discussed in more detail below. The data collection program 118 determines item, auction, or participant characteristics. The data collection program 118 may determine the characteristic data from webpages or other information stored, generated, or accessible from the auction system 130. In addition, the data derivation program 120 may determine additional characteristics from the characteristics obtained from by the data collection program 118, or directly from the information obtained from the auction system 130. The collected and derived characteristics may be stored in the historical auction data 114.

In certain implementations, the result predictor may be trained or perform parameter estimation based on some or all of the historical auction data 114. The optimization program 122 may play a role in the training process. For example, the optimization program 122 may evaluate the result predictions generator by the result predictor against known results and modify parameters in the result predictor for improved accuracy. To that end, an optimization tool such as the Clementine® software available from SPSS of Chicago Ill. may be employed to train the price predictor.

The result predictor generates auction result predictions and delivers one or more of the predictions to the market participant 128. The result predictor may accept the participant specified characteristic data 112 and generate a predicted auction result based on the characteristic data 112. The participant may submit the characteristic data 112 over a communication channel such as a network link, directly into the system 100 through keyboard, mouse, or another input device, or in another manner.

The participant specified characteristic data 112 may include one or more characteristics of an item for which auction result prediction may be sought. A buyer, seller, or other participant may provide the specified characteristic data 112. The specified characteristic data 112 may relate to an auction item itself, such as manufacturer, model number, feature information such as screen size, internal memory, or other auction item characteristics such as those noted in the tables below. Examples of item characteristic data for a PDA are "M125" for a model number "M125" and "16 MB" for a memory capacity.

The specified characteristic data 112 may also relate to an auction for the item, such as an auction title, auction item category, item description, an auction start date and/or time, auction duration, presence or absence of an item image, or other characteristics such as those noted in the tables below. An example of auction characteristic data for a PDA that will be auctioned is the auction title: "Like New Palm M125-16 MB." The specified characteristic data 112 is not limited to item characteristics or auction characteristics, but may include any other data that a price predictor may employ when generating a price prediction.

The historical auction data 114 may represent item, auction, or other data for one or more completed auctions. The historical auction data 114 may include data from successful and unsuccessful auctions. Examples of historical auction data include final price, shipping cost, seller ranking, and other characteristics such as those noted in the tables below.

Figure 4:
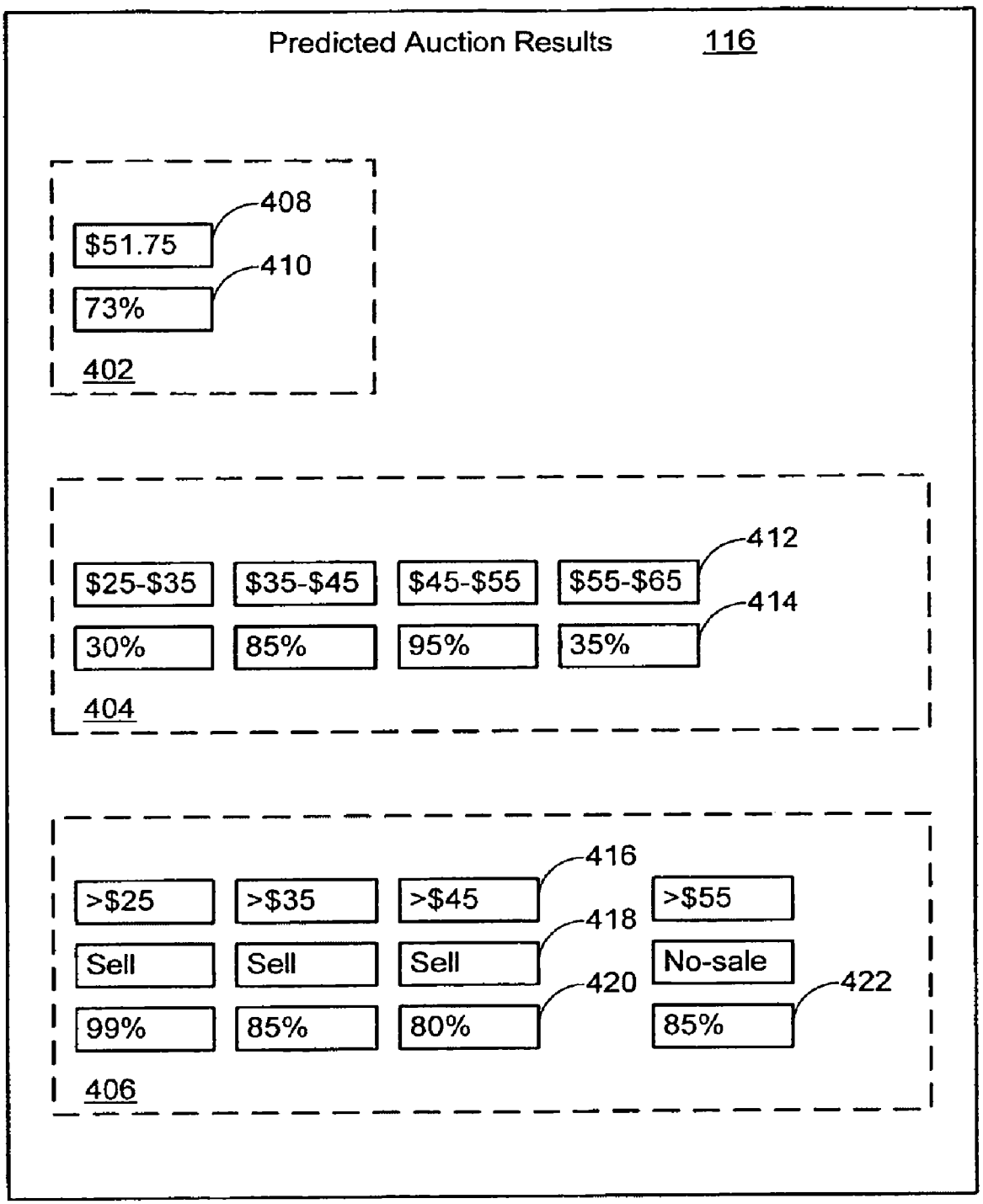
FIG. 4 shows predicted auction results.

Turning to FIG. 4, that figure shows examples of the predicted auction results 116 that a price predictor may generate. The techniques that the price predictor may employ are discussed in more detail below. The predicted auction results may include a predicted end-of-auction price 402, predicted end-of-auction price ranges 404, and predicted end-of-auction price thresholds 406.

The predicted end-of-auction price 402 may include a price prediction 408 and may also include a price prediction confidence measure 410. The price prediction 408 may be a single value that is the predicted final price for an auction. The confidence measure 410 may give the confidence that the price predictor has in the price prediction 408. In the example shown in FIG. 4, the price predictor is 73% confident that the final auction price will be $51.75.

The predicted end-of-auction price ranges 404 may include one or more price bins 412 and may also include associated bin confidence measures 414. A price bin 412 may include a lower value and an upper value that bounds the bin. For example, the price bin 412 has a lower value of $55 and an upper value of $65. The bin confidence measure 414 indicates that the price predictor is 35% confident that the final auction value will be between $55 and $65.

The predicted end-of-auction price thresholds 406 may include one or more price thresholds 416, associated result indicators 418, and associated confidence measures 420. The price thresholds 416 may specify a lower or upper bound on the predicted auction result. For example, the price threshold 416 represents a lower bound of $55. The result indicator 418 may specify whether the auction will obtain a particular result for the item. For example, the result indicator 418 specifies that the item will sell. The confidence measure 420 may specify the confidence that the price predictor has in the price threshold 416 and/or result indicator 418. The confidence measure 420 indicates that the price predictor is 80% confident that the item will sell for at least $45. The confidence measure 422 indicates that the price predictor is 85% confident that the item will not sell for more than $55 (although the item may sell for less).

The bins 412 and/or thresholds 416 may be selected according to any criteria. For example, the bins and/or thresholds 412 and 416 may be selected to cover the range of final auction prices for an item over any selected time period (as examples, 1 week, 1 month, or 1 year). Alternatively, the number of bins or thresholds, and their extents may be selected according to statistical metrics. For example, the width of a bin may be selected according to a standard deviation in final price for an item over any selected time period. As another example, the width of a bin may be selected to be 5%, 10%, or another fraction of the average final price for an item over any selected time period. The bins and thresholds may be revised at any interval, periodically, or according to any other schedule or directive by the system 100 based on the historical auction data 114.

Returning to FIG. 1, in one implementation, the system 100 may obtain historical auction data 114 from the auction systems 130 under a license, fee, purchase plan, subscription, or other arrangement. The system 100 may then download the auction data 132 periodically or at other intervals and update its historical auction data 114.

When the historical auction data 114 is obtained directly from the auction system 130, the system 100 may omit execution of the data collection program 118 and instead update its historical auction data 114 with auction data 132 obtained from the auction system 130. Alternatively or additionally, the data collection program 118 in the memory 104 may execute periodically, on a pre-selected schedule, when instructed, or at other times. The data collection program 118 may obtain all or part of the historical auction data 114. The historical auction data 114 may include auction item characteristics, auction characteristics, and participant (e.g., buyer or seller) characteristics such as seller rating, seller marketplace membership information (e.g., membership start or end date) or other characteristics.

In operation, the data collection program may send data requests to the auction system 130, parse replies from the auction 130 and store characteristic data as historical auction data 114. In one implementation, the data collection program 118 may include one or more Practical Extraction Report Language (PERL) scripts.

The scripts may send data requests by building a data request string and communicating the data request string to the auction system 130. For example, given an auction category for a PDA, the script may build a uniform resource locator (URL) corresponding to an item category search including the PDA auction category that is constructed for parsing by any given auction system 130. Alternatively, the script may build a search URL specifying any other item, auction, or participant characteristic. The script may then submit the URL to a web browser or other communication program for submission to the auction system 130. The scripts and web browser may also emulate mouse or keyboard input, or take other actions to cause the auction systems 130 to generate web pages that include pending or completed auction data.

The auction system 130 responds to the data request by sending data resulting from the request to the system 100. The data may be in text, HTML, images, or other file types. For example, the auction system 130 may respond with one or more pages of HTML that include search results.

In response, the data collection program 118 may parse the search results to extract any desired characteristics. For example, a PERL script may search the HTML for tags or other flags that delimit an auction title, seller rating, item description, shipping information, or other item, auction, or participant characteristics.

Figure 3:
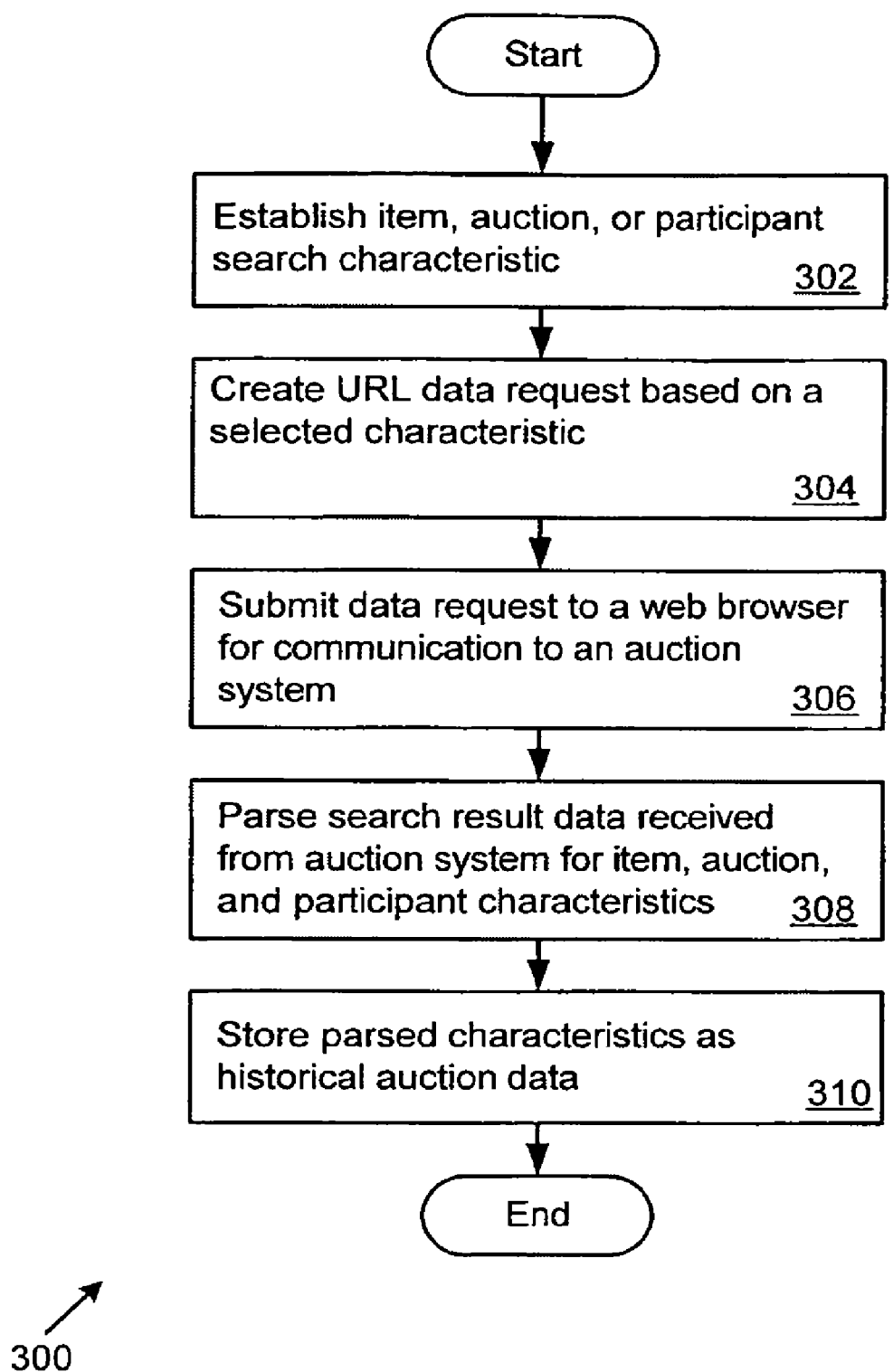
FIG. 3 shows the acts that may be taken by a data collection program.

In FIG. 3, a flow diagram 300 shows the acts that may be taken by the data collection program 118. The data collection program 118 establishes an item, auction, or participant characteristic for which to search (Act 302). The characteristic may be based on the participant specified characteristic data 112. For example, when a seller requests a price prediction for a PDA, the data collection program may select a PDA auction category as the search characteristic.

The data collection program 118 may create a data request (Act 304). The data request may be a URL search string incorporating the search characteristic (Act 304), or may take another form. The data collection program 118 may then submit the data request to a web browser or other communication program for communication to an auction system 130 (Act 306).

The auction system 130 responds with search result data for prior and pending auctions. The data collection program 118 may then parse the search result data (Act 308). For example, PERL scripts may search HTML data for any item, auction, or participant characteristic. The parsed characteristics may be stored as historical auction data (Act 310).

For example, for each item for which a participant requests a predicted auction result, the data collection program 118 cause the system 100 to create a database record. The database record may include one or more of the parameters noted in the tables below. The data collection program 118 may parse the search results to obtain one or more of the parameters.

In addition, the data derivation program 120 may parse the search results and manipulate them to derive additional characteristics from those available directly from the search results. Examples of derived characteristics are given below in the Tables. In one embodiment, the characteristic derivation program 120 may include one or more PERL scripts operable to analyze the text, html, sound files, images, or other data in the search results. For example, the data derivation program 120 may derive item characteristics from an auction title obtained by the data collection program 118.

To that end, a PERL script may scan the auction title for keywords such as "New", "Like New", "Broken", "Sealed", or other keywords. If, for example, the data collection program 118 has obtained the auction title "Like New Palm M125-16 MB", the data derivation program 120 may search the auction title and find the phrase "Like New". The data derivation program 120 derives that the PDA is in like new condition from the auction title and may accordingly store the derived characteristic in the historical auction data 114.

The data derivation program may analyze pending or prior auctions for similar items. A similar item may be an item that shares one or more characteristics, collected, derived, or otherwise, with the participant specified item characteristics 112. For example, a specified item characteristic for a PDA may be the model number M125. Pending and prior auctions that include the keyword "M125" in the title may be considered auctions for similar items.

The data derivation program 120 may also derive auction metrics from one or more prior auctions. As one example, the, the data derivation program 120 may determine a count of the number of auctions for a similar item that end in 5 minutes from the start of an auction for the participant specified item. As another example, the data derivation program 120 may determine a standard deviation of the closing prices of similar items ending 5 minutes before the participant specified item. Additional examples are given below in the Tables.

Figure 6:
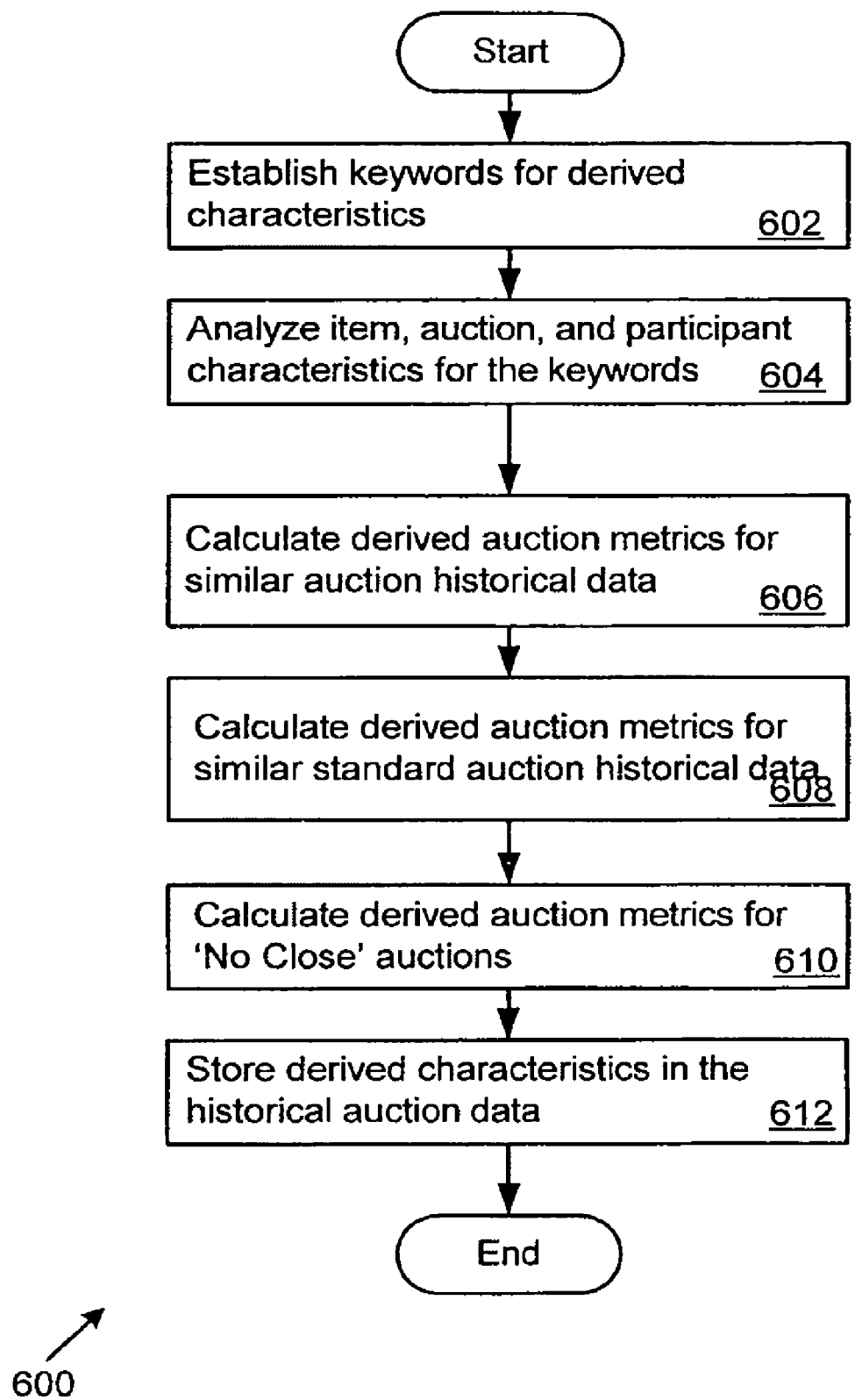
FIG. 6 depicts the acts that may be taken be a characteristic derivation program.

Turning briefly to FIG. 6, a flow diagram 600 shows the acts that may be taken by the data derivation program 120. The data collection program 118 establishes an item, auction, or participant keywords (e.g., "Like New") for which to search (Act 602). The keywords may be selected to extract any characteristic from item, auction, and participant characteristics (Act 604).

The data derivation program 120 may also calculate auction metrics for similar auctions as noted above (Act 606). Additional auction metrics may be calculated for "standard" auctions (Act 608) and "No Close" auctions (610). However, the data derivation program 120 may calculate auction metrics for any subset of auctions or for all auctions. The data derivation program 120 stores the derived characteristics, including the auction metrics, in the historical auction data 114.

No close auctions are auctions for items that did not sell because, as examples, the reserve price was not met or no one bid. A standard auction may be defined in different ways. In one implementation, a standard auction may be an auction for which pre-selected auction characteristics are set or are not set. A non-standard auction may also be an auction for which pre-selected auction characteristics are set or are not set, but that differs in one or more characteristic from the standard auctions. For example, an auction for which a "dutch auction" characteristic or a reserve price characteristic is true or present may be considered a non-standard auction.

A "standard" auction and a "non-standard" auction are specific examples of subsets of all auctions. There may be multiple types of auctions that qualify as standard auctions, non-standard auctions, or any other subset of auctions. For example, one type of non-standard auction may be a dutch auction and a second type of non-standard auction may be a reserve price auction. As another example, a standard auction may be a 5-day auction with no-reserve price or a 7-day auction with an attached image. The system 100 may collect or derive auction characteristics for all auctions or for subsets of all the auctions. The system 100 may collect or derive the same or different characteristics for a subset of auctions that it does for all auctions.

Figure 5:
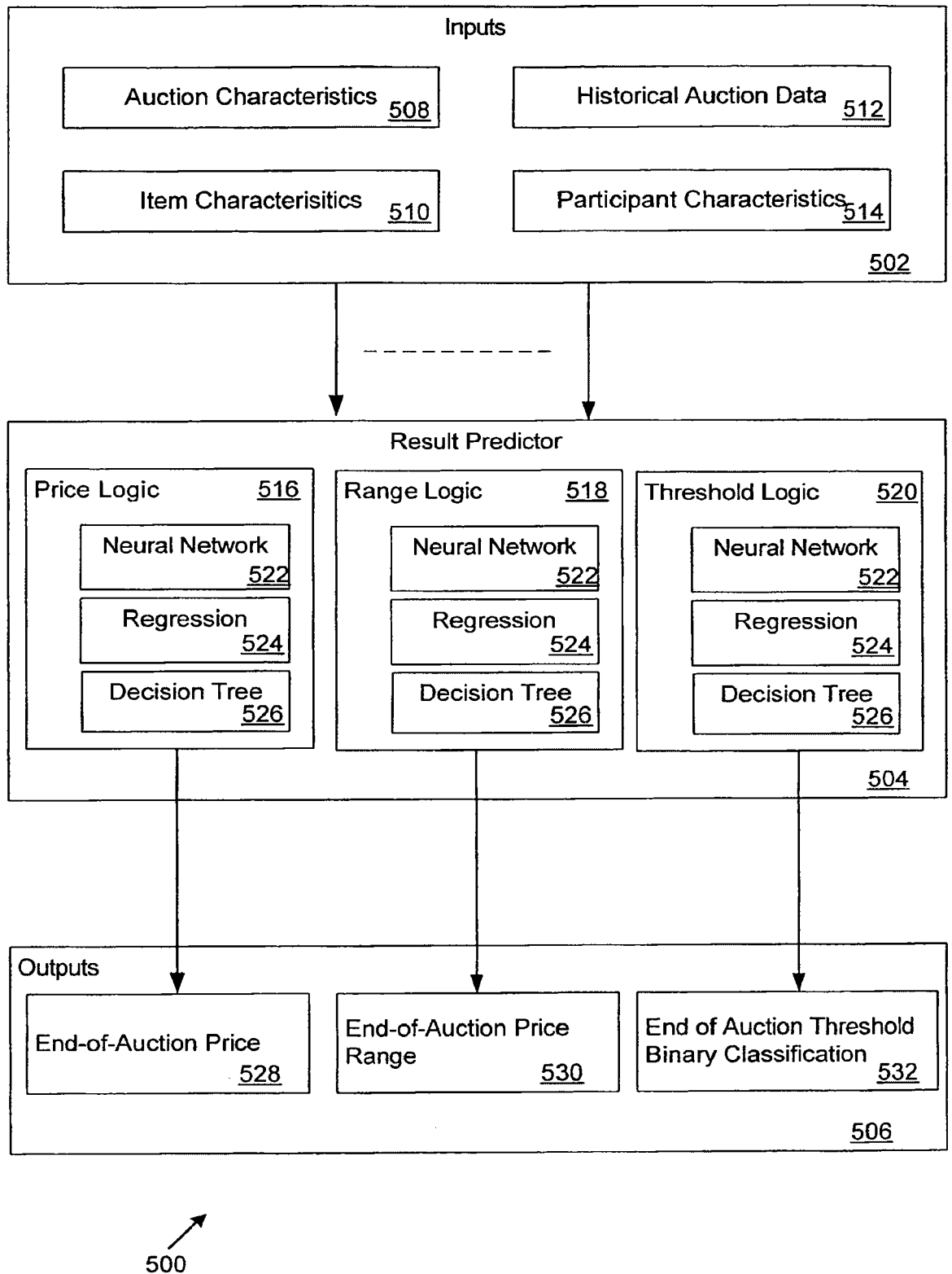
FIG. 5 shows result prediction inputs, result predictors, and result predictions.

In FIG. 5, examples of price prediction inputs 502, price predictors 504, and result predictions 506 are shown. The inputs 502 that describe item, auction, and participant characteristics for prior and pending auctions are provided to a result predictor 504, which creates end-of-auction result outputs 506 for the selected auction. The price prediction inputs 502 may include auction characteristics 508, item characteristics 510, historical auction data 512, participant characteristics 514, or other characteristics. One or more of the characteristics, collected, derived, or otherwise, may be provided to the price predictor 504.

The result predictor 504 may include three types of prediction logic, circuitry, or algorithms: price logic 516, range logic 518, and threshold logic 520. Each type of result predictor 504 may generate confidence measures in concert with performing a result prediction. The price logic 516 may generate an end-of-auction price and/or a confidence measure as a predicted auction result. The range logic 518 may generate an end-of-auction price bin and/or confidence measure as a predicted auction result. The threshold logic 520 may produce an end-of-auction threshold or binary classification, confidence measure, and/or result indicator as a predicted auction result. The price predictor may include multiple different types of prediction logic 516, 518, and 520 to generate one or more predicted auction results, such as a single combined result prediction output.

The prediction logic 516, 518, and 520 may include one or more machine learning algorithms to determine result predictions 506. Any type of prediction logic 516, 518, and 520 may employ neural networks 522, regression logic 524, and decision tree logic 526. In one embodiment, one machine learning algorithm may determine the auction result predictions 506. Alternatively, multiple machine learning algorithms may be used to generate one or more of the auction result predictions 506. An output for each algorithm included in the price predictor 504 may be included. Alternately, one or more result predictions 506 may be statistically combined to produce fewer result predictions.

The prediction logic 516, 518, and 520 may vary widely in implementation. For example, the neural networks 522 may be a real or virtual device employing interconnected processing elements that adapt and learn from past patterns. In practice, neural networks comprise a number of interconnected processing elements that send data to each other along connections of varying strength. The strengths of the connections are represented by weights. The processing element receives inputs, either directly from inputs to the system 100 or from other processing elements. Each of the inputs is then multiplied by a corresponding weight, and the results are added together to form a weighted sum. A transfer function may be applied to the weighted sum to obtain a value known as the state of the element. The state is then either passed on to another element along a weighted connection, or provided as an output signal. Collectively, states are used to represent information in the short term, while weights represent long-term information or learning. The network may be trained by repeatedly presenting inputs having a known output such as historical auction data 114, comparing the network 522 output to the known result, and modifying the weights to reduce or minimize errors.

The prediction inputs 502 may be input to the trained neural networks 522. The neural networks 522 may provide multiple price threshold outputs. The weighted sum or state information of the processing element driving the price threshold output may represent, or may be used to determine, a confidence measure in the predicted result.

The regression logic 524 may implement any type of regression algorithm, such as a linear regression algorithm, a logistic regression algorithm, a polynomial regression algorithm, or a kernel regression algorithm. A linear regression algorithm may fit a straight line through a set of points using some goodness-of-fit metric. The set of points may correspond to characteristics of historical auction results. In one embodiment, one or more of the N input characteristics may contribute to a linear regression equation that fits the set of points. The coefficients for each variable in the linear regression equation may then be applied to a subsequent auction to produce a result prediction.

The decision tree logic 526 may generate a representation of alternatives in a decision making process. For example, the decision tree logic 526 may be constructed using historical data 114 to define a series of nodes. The nodes are interconnected with one another based on dependencies, with each path having a corresponding probability of occurrence. The value of each input 502 characteristic may be used to traverse the tree in order to predict an auction result. The probabilities of each node encountered may be combined to determine a confidence in the predicted outcome.

The result predictions 506 may include an end-of-auction price 528, an end-of-auction price range or bin 530, and/or an end-of-auction price threshold 532. Each prediction 506 may be associated with a confidence measure. FIG. 4 describes the result predictions 506 in additional detail.

Figure 7:
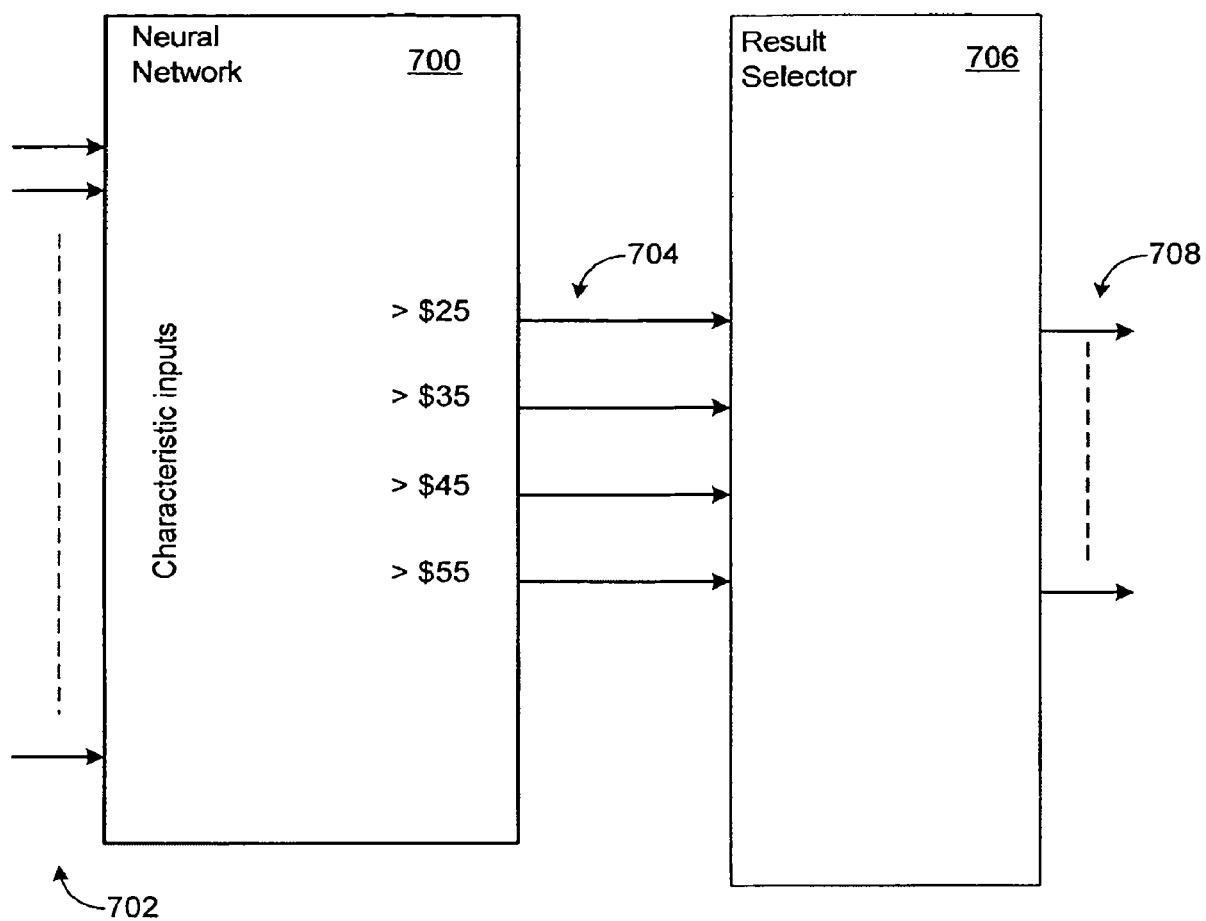
FIG. 7 shows a neural network auction result predictor.

In FIG. 7, a result predictor in the form of a neural network 700 is shown. The neural network 700 may be implemented in hardware, software, or both, and may be trained on all or part of the historical auction data 114 (e.g., 40% of the historical auction data) or on other data. The neural network 700 may include parameter inputs 702, and result prediction outputs 704.

The neural network parameters such as momentum terms, learning rates, parameter decay, and other parameters may vary widely between implementations. Examples are given below for an implementation with the Clementine (R) tool. As one example, the neural network 502 may employ a learning rate with Alpha approximately 0.7, an initial value of Eta of approximately 0.4, an upper value of Eta approximately 0.1, a lower value of Eta approximately 0.01, and an Eta decay value of approximately 20.

The Alpha parameter may be a momentum term and may be used in updating the weights during training. The momentum term may keep weight changes moving in a consistent direction. Higher values of the momentum term may help the neural network escape local minima. The Eta parameter may be a learning rate. The learning rate may control how much the weights are adjusted at each update. The learning rate may change or remain constant as training proceeds.

The initial value of Eta may give the starting value of the Eta parameter. During training, the Eta parameter may start at the initial value of Eta and decrease to the lower value of Eta. The Eta parameter may then reset to the upper value of Eta and decrease to lower value of Eta one or more times during training. The Eta decay value may specify the rate at which the Eta parameter decreases. The Eta decay may be expressed as the number of cycles over which the Eta parameter changes from the upper value of Eta to the lower value of Eta.

The neural network 700 may include one or more hidden layers with approximately 20 processing elements, and persistence of approximately 200. Each result prediction output 704 may represent a binary classification or end-of-auction threshold. The value of the state or weighted sum at each prediction output 704 may reflect a confidence measure for the price threshold assigned to the prediction output 704.

In one embodiment, a result selector 706 may be coupled to the neural network 700. The result selector 706 may accept one or more prediction outputs 704 and determine one or more result predictions 708 to deliver to a marketplace participant 128. For example, the result selector 706 may respond to configuration settings provided by the participant 128 to deliver the most likely of the price predictions, all of the price predictions, a price prediction at which a result indicator transitions from "Sell" to "No Sell", or any other price prediction. With reference to FIG. 4, the result selector 706 may deliver a price prediction of "Sell for more than >$45, with 85% confidence" as the most likely result. Alternatively, the result selector 706 may deliver all or a subset of the predicted price thresholds, confidence measures, and result indicators to the participant 128. When multiple result predictions are approximately equally likely, the result selector 706 may choose the first result prediction, average the result predictions, select a result prediction at random, deliver all the result predictions to the participant, or determine the result prediction to deliver in another manner.

The result prediction technology lends itself to a variety of applications. Predicting an end-price before an auction starts provides an opportunity for a third-party to offer price insurance to sellers. An insurer may obtain a predicted end-price from the system 100, and may offer a seller or other individual or entity insurance that the auction item will sell for at least an insured price. The insured price may be the most likely predicted end-price, but is not limited to the most likely end-price. In return, the insurer may collect an insurance premium. The terms of the insurance may specify, for example, that if the auction item sells for less than the predicted end-price, the insurer will reimburse the seller for the difference between the insured price and the selling price.

Another application of the result prediction technology is a listing optimizer. The listing optimizer may assist sellers in creating auctions with characteristics tailored to achieve higher end-prices. For example, a seller may input item characteristics for an item they will sell, participant characteristics that describe the seller, or other characteristics. The listing optimizer may then run end-price predictions in which one or more of the characteristics are varied between predictions. The listing optimizer may track each end-price and modify the input characteristics to determine their influence on the end-price. After one or more predictions, the listing optimizer may identify changes to item, auction, or seller characteristics that may increase the end-price. Accordingly, the listing optimizer may communicate suggestions to the seller for setting the item, auction, or seller characteristics such as starting time, starting bid, use of photos, reserve price, words to describe the item, or other characteristics that may increase the end-price.

The result prediction technology may provide accurate auction result prediction. The price prediction technology is particularly well adapted to situations where a set of characteristics about the auction, item for sale and/or seller are known. Even when a limited set of historical auction data is available or the data is loosely structured, the price prediction can proceed without substantial loss accuracy. With meaningful auction result prediction, some of the risks of offering an item for sale at auction may be reduced, attracting more buyers and sellers to the marketplace and increasing the value of the marketplace. Having access to the likely end-price of auction items opens up a wide variety of services that can be offered to both buyers, sellers, and third parties in online auctions.

In one implementation, the historical auction data 114 may encompass three major categories of historical data: similar auctions, similar standard auctions, and "No Close" auctions. The similar auction data and similar standard auction data may each include four sub-categories: historical counts, historical starting price information, historical closing price information, and historical shipping amount information. The Tables below give examples of each type of historical auction data 114.

Tables of item, auction, and participant characteristics, both collected and derived, are given below. Table 1 shows exemplary collected auction characteristics. Table 2 shows exemplary derived auction characteristics for a PDA. Tables 3, 4, 5 and 6 show exemplary derived similar auction historical data. Tables 7, 8, 9 and 10 show exemplary derived similar standard auction historical data. Table 11 shows an exemplary set of derived "No close" auction historical data.

TABLE 1

Collected Characteristics

| Characteristic | Description |
| --- | --- |
| ITEMNUMBER | The online marketplace identifier for an auction |
| TITLE | Auction title |
| SELLERID | The seller's online marketplace user ID |
| SELLERRATING | Seller rating, e.g., assigned by the online marketplace based on feedback received by other online marketplace users |
| SELLERHASMEPAGE | Indicates the seller has a introductory/bio webpage on the online marketplace website |
| SELLERISPOWERSELLER | Indicates a seller has a large number of successful sales |
| FIRSTBID | The minimum price for the auction |
| HIGHBID | The closing price of the auction |
| ACCEPTSPAYMENTSERVICE | Indicates the seller accepts payments through a secure third party payment service |
| ISDUTCH | Indicates the auction is set up as a Dutch auction |
| ISRESERVE | Indicates the seller set up a reserve price for the auction |
| ISRESERVEMET | Indicates that the closing price exceeded the reserve price set by the seller |
| QUANTITYAVAILABLE | Indicates the number of items available |
| TOTALBIDS | The total number of bids placed on the item during the course of the auction |
| HIGHBIDDERID | The winning bidder's online marketplace user ID |
| STARTDATE | The beginning date and time of the auction |
| ENDDATE | The ending date and time of the auction |
| ISCOMPLETE | Indicates the auction ended at the set date/time without being cancelled by the seller |
| ISFIXEDPRICE | Indicates the seller set up a "Buy it now" price for immediate sale of the item |
| SELLERHASSHADES | Indicates that the seller has recently changed their email and billing information |
| CATEGORY | The identifying number for the primary item category chosen for the auction |
| BUYITNOWUSED | Indicates the item was purchased using the "Buy it now" feature |
| ISGIFT | Indicates the seller has chosen to add a gift box icon to the listing to indicate the item would be a good gift |
| SUBTITLE | Subtitle text if specified by seller |
| CATEGORY2 | The identifying number for a secondary item category for the auction |
| SHIPPINGAMOUNT | The shipping amount to be paid by the buyer |
| PREFERSTHIRDPARTYPAYMENT | Indicates the seller's preferred method of payment is through a third party payment service. |
| POSITIVEFEEDBACKPERCENT | The percent of positive feedback (of all the feedback) received by the seller |

TABLE 1-continued

Collected Characteristics

| Characteristic | Description |
| --- | --- |
| HASPICTURE | Indicates the seller included a picture with the listing |
| MEMBERSINCE | The date the seller created their online marketplace user account |
| HASEBAYSTORE | Indicates the seller has an online retail page on the online site |

TABLE 2

Derived PDA Characteristics

| | |
| --- | --- |
| NEW | Indicates the existence of the word "new" in the title |
| BROKEN | Indicates the existence of the word "broken" in the title |
| LIKENEW | Indicates the existence of the phrase "like new" in the title |
| SEALED | Indicates the existence of the word "sealed" in the title |
| MANUFACTURER | The item manufacturer, extracted from the title |
| SCREEN | The item screen features, extracted from the title |
| MODEL | The item model, extracted from the title |
| MEMORY | The item memory features, extracted from the title |
| FEATURES | Other item features, extracted from the title |
| STARTDAY | The day of the week (number) that the auction started |
| STARTDAYTEXT | The day of the week (text) that the auction started |
| ENDDAY | The day of the week (number) that the auction ended |
| ENDDAYTEXT | The day of the week (text) that the auction ended |
| AUCTIONLENGTH | The number of days that the auction lasted |
| BUYERPAYS | Contains "true" if buyer pays for shipping, "false" if seller pays |
| FREESHIPPING | Contains "true" if shipping is free to the buyer |
| SEARCHDESCRIPTIONFORSHIPPING | Indicates that the shipping amount was not specified in its designated place (ShippingAmount field) and a search was done in the description text to get the price |
| SHIPPINGCHARGE | The ShippingAmount or the amount found in the description text search |

TABLE 3

Similar Auction Counts

| | |
| --- | --- |
| COUNT_CURRENT | Count of similar item auctions open when the specified auction started |
| COUNT_IN_5MI | Count of similar item auctions ending 5 minutes before the specified auction started |
| COUNT_IN_30MI | Count of similar item auctions ending 30 minutes before the specified auction started |
| COUNT_IN_1HR | Count of similar item auctions ending 1 hour before the specified auction started |
| COUNT_IN_2HR | Count of similar item auctions ending 2 hours before the specified auction started |
| COUNT_IN_4HR | Count of similar item auctions ending 4 hours before the specified auction started |

TABLE 3-continued

Similar Auction Counts

| | |
| --- | --- |
| COUNT_IN_8HR | Count of similar item auctions ending 8 hours before the specified auction started |
| COUNT_IN_12HR | Count of similar item auctions ending 12 hours before the specified auction started |
| COUNT_IN_24HR | Count of similar item auctions ending 1 day before the specified auction started |
| COUNT_IN_48HR | Count of similar item auctions ending 2 days before the specified auction started |
| COUNT_IN_60HR | Count of similar item auctions ending 2.5 days before the specified auction started |
| COUNT_IN_240HR | Count of similar item auctions ending 10 days before the specified auction started |
| COUNT_ALL | Count of similar item auctions (in stored history) ending before the specified auction started |

TABLE 4

Similar Auction Closing Price Information

| | |
| --- | --- |
| MAX_CP_CURRENT | Maximum closing price of similar item auctions open when the specified auction started |
| MIN_CP_CURRENT | Minimum closing price of similar item auctions open when the specified auction started |
| AVG_CP_CURRENT | Average closing price of similar item auctions open when the specified auction started |
| STD_CP_CURRENT | Standard deviation of the closing prices of similar item auctions open when the specified auction started |
| MAX_CP_IN_5MI | Maximum closing price of similar item auctions ending 5 minutes before the specified auction started |
| MIN_CP_IN_5MI | Minimum closing price of similar item auctions ending 5 minutes before the specified auction started |
| AVG_CP_IN_5MI | Average closing price of similar item auctions ending 5 minutes before the specified auction started |
| STD_CP_IN_5MI | Std. Dev. of the closing prices of similar item auctions ending 5 minutes before the specified auction started |
| MAX_CP_IN_30MI | Maximum closing price of similar item auctions ending 30 minutes before the specified auction started |
| MIN_CP_IN_30MI | Minimum closing price of similar item auctions ending 30 minutes before the specified auction started |
| AVG_CP_IN_30MI | Average closing price of similar item auctions ending 30 minutes before the specified auction started |
| STD_CP_IN_30MI | Std. Dev. of the closing prices of similar item auctions ending 30 minutes before the specified auction started |
| MAX_CP_IN_1HR | Maximum closing price of similar item auctions ending 1 hour before the specified auction started |
| MIN_CP_IN_1HR | Minimum closing price of similar item auctions ending 1 hour before the specified auction started |
| AVG_CP_IN_1HR | Average closing price of similar item auctions ending 1 hour before the specified auction started |
| STD_CP_IN_1HR | Std. Dev. of the closing prices of similar item auctions ending 1 hour before the specified auction started |
| MAX_CP_IN_2HR | Maximum closing price of similar item auctions ending 2 hours before the specified auction started |
| MIN_CP_IN_2HR | Minimum closing price of similar item auctions ending 2 hours before the specified auction started |
| AVG_CP_IN_2HR | Average closing price of similar item auctions ending 2 hours before the specified auction started |

TABLE 4-continued

Similar Auction Closing Price Information

| | |
|---|---|
| STD_CP_IN_2HR | Std. Dev. of the closing prices of similar item auctions ending 2 hours before the specified auction started |
| MAX_CP_IN_4HR | Maximum closing price of similar item auctions ending 4 hours before the specified auction started |
| MIN_CP_IN_4HR | Minimum closing price of similar item auctions ending 4 hours before the specified auction started |
| AVG_CP_IN_4HR | Average closing price of similar item auctions ending 4 hours before the specified auction started |
| STD_CP_IN_4HR | Std. Dev. of the closing prices of similar item auctions ending 4 hours before the specified auction started |
| MAX_CP_IN_8HR | Maximum closing price of similar item auctions ending 8 hours before the specified auction started |
| MIN_CP_IN_8HR | Minimum closing price of similar item auctions ending 8 hours before the specified auction started |
| AVG_CP_IN_8HR | Average closing price of similar item auctions ending 8 hours before the specified auction started |
| STD_CP_IN_8HR | Std. Dev. of the closing prices of similar item auctions ending 8 hours before the specified auction started |
| MAX_CP_IN_12HR | Maximum closing price of similar item auctions ending 12 hours before the specified auction started |
| MIN_CP_IN_12HR | Minimum closing price of similar item auctions ending 12 hours before the specified auction started |
| AVG_CP_IN_12HR | Average closing price of similar item auctions ending 12 hours before the specified auction started |
| STD_CP_IN_12HR | Std. Dev. of the closing prices of similar item auctions ending 12 hours before the specified auction started |
| MAX_CP_IN_24HR | Maximum closing price of similar item auctions ending 1 day before the specified auction started |
| MIN_CP_IN_24HR | Minimum closing price of similar item auctions ending 1 day before the specified auction started |
| AVG_CP_IN_24HR | Average closing price of similar item auctions ending 1 day before the specified auction started |
| STD_CP_IN_24HR | Std. Dev. of the closing prices of similar item auctions ending 1 day before the specified auction started |
| MAX_CP_IN_48HR | Maximum closing price of similar item auctions ending 2 days before the specified auction started |
| MIN_CP_IN_48HR | Minimum closing price of similar item auctions ending 2 days before the specified auction started |
| AVG_CP_IN_48HR | Average closing price of similar item auctions ending 2 days before the specified auction started |
| STD_CP_IN_48HR | Std. Dev. of the closing prices of similar item auctions ending 2 days before the specified auction started |
| MAX_CP_IN_60HR | Maximum closing price of similar item auctions ending 2.5 days before the specified auction started |
| MIN_CP_IN_60HR | Minimum closing price of similar item auctions ending 2.5 days before the specified auction started |
| AVG_CP_IN_60HR | Average closing price of similar item auctions ending 2.5 days before the specified auction started |
| STD_CP_IN_60HR | Std. Dev. of the closing prices of similar item auctions ending 2.5 days before the specified auction started |
| MAX_CP_IN_240HR | Maximum closing price of similar item auctions ending 10 days before the specified auction started |
| MIN_CP_IN_240HR | Minimum closing price of similar item auctions ending 10 days before the specified auction started |
| AVG_CP_IN_240HR | Average closing price of similar item auctions ending 10 days before the specified auction started |
| STD_CP_IN_240HR | Std. Dev. of the closing prices of similar item auctions ending 10 days before the specified auction started |
| MAX_CP_ALL | Maximum closing price of similar item auctions (in stored history) ending before the specified auction started |
| MIN_CP_ALL | Minimum closing price of similar item auctions (in stored history) ending before the specified auction started |
| AVG_CP_ALL | Average closing price of similar item auctions (in stored history) ending before the specified auction started |
| STD_CP_ALL | Std. Dev. of the closing prices of similar item auctions (in stored history) ending before the specified auction started |

TABLE 5

Similar Auction Starting Price Information

| | |
|---|---|
| MAX_SP_CURRENT | Maximum starting price of similar item auctions open when the specified auction started |
| MIN_SP_CURRENT | Minimum starting price of similar item auctions open when the specified auction started |
| AVG_SP_CURRENT | Average starting price of similar item auctions open when the specified auction started |
| STD_SP_CURRENT | Standard deviation of the starting prices of similar item auctions open when the specified auction started |
| MAX_SP_IN_5MI | Maximum starting price of similar item auctions ending 5 minutes before the specified auction started |
| MIN_SP_IN_5MI | Minimum starting price of similar item auctions ending 5 minutes before the specified auction started |
| AVG_SP_IN_5MI | Average starting price of similar item auctions ending 5 minutes before the specified auction started |
| STD_SP_IN_5MI | Std. Dev. of the starting prices of similar item auctions ending 5 minutes before the specified auction started |
| MAX_SP_IN_30MI | Maximum starting price of similar item auctions ending 30 minutes before the specified auction started |
| MIN_SP_IN_30MI | Minimum starting price of similar item auctions ending 30 minutes before the specified auction started |
| AVG_SP_IN_30MI | Average starting price of similar item auctions ending 30 minutes before the specified auction started |
| STD_SP_IN_30MI | Std. Dev. of the starting prices of similar item auctions ending 30 minutes before the specified auction started |
| MAX_SP_IN_1HR | Maximum starting price of similar item auctions ending 1 hour before the specified auction started |
| MIN_SP_IN_1HR | Minimum starting price of similar item auctions ending 1 hour before the specified auction started |
| AVG_SP_IN_1HR | Average starting price of similar item auctions ending 1 hour before the specified auction started |
| STD_SP_IN_1HR | Std. Dev. of the starting prices of similar item auctions ending 1 hour before the specified auction started |
| MAX_SP_IN_2HR | Maximum starting price of similar item auctions ending 2 hours before the specified auction started |

TABLE 5-continued

Similar Auction Starting Price Information

| | |
|---|---|
| MIN_SP_IN_2HR | Minimum starting price of similar item auctions ending 2 hours before the specified auction started |
| AVG_SP_IN_2HR | Average starting price of similar item auctions ending 2 hours before the specified auction started |
| STD_SP_IN_2HR | Std. Dev. of the starting prices of similar item auctions ending 2 hours before the specified auction started |
| MAX_SP_IN_4HR | Maximum starting price of similar item auctions ending 4 hours before the specified auction started |
| MIN_SP_IN_4HR | Minimum starting price of similar item auctions ending 4 hours before the specified auction started |
| AVG_SP_IN_4HR | Average starting price of similar item auctions ending 4 hours before the specified auction started |
| STD_SP_IN_4HR | Std. Dev. of the starting prices of similar item auctions ending 4 hours before the specified auction started |
| MAX_SP_IN_8HR | Maximum starting price of similar item auctions ending 8 hours before the specified auction started |
| MIN_SP_IN_8HR | Minimum starting price of similar item auctions ending 8 hours before the specified auction started |
| AVG_SP_IN_8HR | Average starting price of similar item auctions ending 8 hours before the specified auction started |
| STD_SP_IN_8HR | Std. Dev. of the starting prices of similar item auctions ending 8 hours before the specified auction started |
| MAX_SP_IN_12HR | Maximum starting price of similar item auctions ending 12 hours before the specified auction started |
| MIN_SP_IN_12HR | Minimum starting price of similar item auctions ending 12 hours before the specified auction started |
| AVG_SP_IN_12HR | Average starting price of similar item auctions ending 12 hours before the specified auction started |
| STD_SP_IN_12HR | Std. Dev. of the starting prices of similar item auctions ending 12 hours before the specified auction started |
| MAX_SP_IN_24HR | Maximum starting price of similar item auctions ending 1 day before the specified auction started |
| MIN_SP_IN_24HR | Minimum starting price of similar item auctions ending 1 day before the specified auction started |
| AVG_SP_IN_24HR | Average starting price of similar item auctions ending 1 day before the specified auction started |
| STD_SP_IN_24HR | Std. Dev. of the starting prices of similar item auctions ending 1 day before the specified auction started |
| MAX_SP_IN_48HR | Maximum starting price of similar item auctions ending 2 days before the specified auction started |
| MIN_SP_IN_48HR | Minimum starting price of similar item auctions ending 2 days before the specified auction started |
| AVG_SP_IN_48HR | Average starting price of similar item auctions ending 2 days before the specified auction started |
| STD_SP_IN_48HR | Std. Dev. of the starting prices of similar item auctions ending 2 days before the specified auction started |
| MAX_SP_IN_60HR | Maximum starting price of similar item auctions ending 2.5 days before the specified auction started |
| MIN_SP_IN_60HR | Minimum starting price of similar item auctions ending 2.5 days before the specified auction started |
| AVG_SP_IN_60HR | Average starting price of similar item auctions ending 2.5 days before the specified auction started |
| STD_SP_IN_60HR | Std. Dev. of the starting prices of similar item auctions ending 2.5 days before the specified auction started |
| MAX_SP_IN_240HR | Maximum starting price of similar item auctions ending 10 days before the specified auction started |
| MIN_SP_IN_240HR | Minimum starting price of similar item auctions ending 10 days before the specified auction started |
| AVG_SP_IN_240HR | Average starting price of similar item auctions ending 10 days before the specified auction started |
| STD_SP_IN_240HR | Std. Dev. of the starting prices of similar item auctions ending 10 days before the specified auction started |
| MAX_SP_ALL | Maximum starting price of similar item auctions (in stored history) ending before the specified auction started |
| MIN_SP_ALL | Minimum starting price of similar item auctions (in stored history) ending before the specified auction started |
| AVG_SP_ALL | Average starting price of similar item auctions (in stored history) ending before the specified auction started |
| STD_SP_ALL | Std. Dev. of the starting prices of similar item auctions (in stored history) ending before the specified auction started |

TABLE 6

Similar Auction Shipping Information

| | |
|---|---|
| MAX_SA_CURRENT | Maximum shipping amount of similar item auctions open when the specified auction started |
| MIN_SA_CURRENT | Minimum shipping amount of similar item auctions open when the specified auction started |
| AVG_SA_CURRENT | Average shipping amount of similar item auctions open when the specified auction started |
| STD_SA_CURRENT | Standard deviation of the shipping amounts of similar item auctions open when the specified auction started |
| MAX_SA_IN_5MI | Maximum shipping amount of similar item auctions ending 5 minutes before the specified auction started |
| MIN_SA_IN_5MI | Minimum shipping amount of similar item auctions ending 5 minutes before the specified auction started |
| AVG_SA_IN_5MI | Average shipping amount of similar item auctions ending 5 minutes before the specified auction started |
| STD_SA_IN_5MI | Std. Dev. of the shipping amounts of similar item auctions ending 5 minutes before the specified auction started |
| MAX_SA_IN_30MI | Maximum shipping amount of similar item auctions ending 30 minutes before the specified auction started |
| MIN_SA_IN_30MI | Minimum shipping amount of similar item auctions ending 30 minutes before the specified auction started |
| AVG_SA_IN_30MI | Average shipping amount of similar item auctions ending 30 minutes before the specified auction started |
| STD_SA_IN_30MI | Std. Dev. of the shipping amounts of similar item auctions ending 30 minutes before the specified auction started |
| MAX_SA_IN_1HR | Maximum shipping amount of similar item auctions ending 1 hour before the specified auction started |
| MIN_SA_IN_1HR | Minimum shipping amount of similar item auctions ending 1 hour before the specified auction started |

TABLE 6-continued

Similar Auction Shipping Information

| | |
|---|---|
| AVG_SA_IN_1HR | Average shipping amount of similar item auctions ending 1 hour before the specified auction started |
| STD_SA_IN_1HR | Std. Dev. of the shipping amounts of similar item auctions ending 1 hour before the specified auction started |
| MAX_SA_IN_2HR | Maximum shipping amount of similar item auctions ending 2 hours before the specified auction started |
| MIN_SA_IN_2HR | Minimum shipping amount of similar item auctions ending 2 hours before the specified auction started |
| AVG_SA_IN_2HR | Average shipping amount of similar item auctions ending 2 hours before the specified auction started |
| STD_SA_IN_2HR | Std. Dev. of the shipping amounts of similar item auctions ending 2 hours before the specified auction started |
| MAX_SA_IN_4HR | Maximum shipping amount of similar item auctions ending 4 hours before the specified auction started |
| MIN_SA_IN_4HR | Minimum shipping amount of similar item auctions ending 4 hours before the specified auction started |
| AVG_SA_IN_4HR | Average shipping amount of similar item auctions ending 4 hours before the specified auction started |
| STD_SA_IN_4HR | Std. Dev. of the shipping amounts of similar item auctions ending 4 hours before the specified auction started |
| MAX_SA_IN_8HR | Maximum shipping amount of similar item auctions ending 8 hours before the specified auction started |
| MIN_SA_IN_8HR | Minimum shipping amount of similar item auctions ending 8 hours before the specified auction started |
| AVG_SA_IN_8HR | Average shipping amount of similar item auctions ending 8 hours before the specified auction started |
| STD_SA_IN_8HR | Std. Dev. of the shipping amounts of similar item auctions ending 8 hours before the specified auction started |
| MAX_SA_IN_12HR | Maximum shipping amount of similar item auctions ending 12 hours before the specified auction started |
| MIN_SA_IN_12HR | Minimum shipping amount of similar item auctions ending 12 hours before the specified auction started |
| AVG_SA_IN_12HR | Average shipping amount of similar item auctions ending 12 hours before the specified auction started |
| STD_SA_IN_12HR | Std. Dev. of the shipping amounts of similar item auctions ending 12 hours before the specified auction started |
| MAX_SA_IN_24HR | Maximum shipping amount of similar item auctions ending 1 day before the specified auction started |
| MIN_SA_IN_24HR | Minimum shipping amount of similar item auctions ending 1 day before the specified auction started |
| AVG_SA_IN_24HR | Average shipping amount of similar item auctions ending 1 day before the specified auction started |
| STD_SA_IN_24HR | Std. Dev. of the shipping amounts of similar item auctions ending 1 day before the specified auction started |
| MAX_SA_IN_48HR | Maximum shipping amount of similar item auctions ending 2 days before the specified auction started |
| MIN_SA_IN_48HR | Minimum shipping amount of similar item auctions ending 2 days before the specified auction started |
| AVG_SA_IN_48HR | Average shipping amount of similar item auctions ending 2 days before the specified auction started |
| STD_SA_IN_48HR | Std. Dev. of the shipping amounts of similar item auctions ending 2 days before the specified auction started |
| MAX_SA_IN_60HR | Maximum shipping amount of similar item auctions ending 2.5 days before the specified auction started |
| MIN_SA_IN_60HR | Minimum shipping amount of similar item auctions ending 2.5 days before the specified auction started |
| AVG_SA_IN_60HR | Average shipping amount of similar item auctions ending 2.5 days before the specified auction started |
| STD_SA_IN_60HR | Std. Dev. of the shipping amounts of similar item auctions ending 2.5 days before the specified auction started |
| MAX_SA_IN_240HR | Maximum shipping amount of similar item auctions ending 10 days before the specified auction started |
| MIN_SA_IN_240HR | Minimum shipping amount of similar item auctions ending 10 days before the specified auction started |
| AVG_SA_IN_240HR | Average shipping amount of similar item auctions ending 10 days before the specified auction started |
| STD_SA_IN_240HR | Std. Dev. of the shipping amounts of similar item auctions ending 10 days before the specified auction started |
| MAX_SA_ALL | Maximum shipping amount of similar item auctions (in stored history) ending before the specified auction started |
| MIN_SA_ALL | Minimum shipping amount of similar item auctions (in stored history) ending before the specified auction started |
| AVG_SA_ALL | Average shipping amount of similar item auctions (in stored history) ending before the specified auction started |
| STD_SA_ALL | Std. Dev. of the shipping amounts of similar item auctions (in stored history) ending before the specified auction started |

TABLE 7

Similar Standard Auction Counts

| | |
|---|---|
| F_COUNT_CURRENT | Count of similar standard item auctions open when the specified auction started |
| F_COUNT_IN_5MI | Count of similar standard item auctions ending 5 minutes before the specified auction started |
| F_COUNT_IN_30MI | Count of similar standard item auctions ending 30 minutes before the specified auction started |
| F_COUNT_IN_1HR | Count of similar standard item auctions ending 1 hour before the specified auction started |
| F_COUNT_IN_2HR | Count of similar standard item auctions ending 2 hours before the specified auction started |
| F_COUNT_IN_4HR | Count of similar standard item auctions ending 4 hours before the specified auction started |
| F_COUNT_IN_8HR | Count of similar standard item auctions ending 8 hours before the specified auction started |
| F_COUNT_IN_12HR | Count of similar standard item auctions ending 12 hours before the specified auction started |
| F_COUNT_IN_24HR | Count of similar standard item auctions ending 1 day before the specified auction started |
| F_COUNT_IN_48HR | Count of similar standard item auctions ending 2 days before the specified auction started |
| F_COUNT_IN_60HR | Count of similar standard item auctions ending 2.5 days before the specified auction started |
| F_COUNT_IN_240HR | Count of similar standard item auctions ending 10 days before the specified auction started |
| F_COUNT_ALL | Count of similar standard item auctions (in stored history) ending before the specified auction started |

TABLE 8

Similar Standard Auction Closing Price Information

| | |
|---|---|
| F_MAX_SP_CURRENT | Maximum closing price of similar standard item auctions open when the specified auction started |
| F_MIN_SP_CURRENT | Minimum closing price of similar standard item auctions open when the specified auction started |
| F_AVG_SP_CURRENT | Average closing price of similar standard item auctions open when the specified auction started |
| F_STD_SP_CURRENT | Standard deviation of the closing prices of similar standard item auctions open when the specified auction started |
| F_MAX_SP_IN_5MI | Maximum closing price of similar standard item auctions ending 5 minutes before the specified auction started |
| F_MIN_SP_IN_5MI | Minimum closing price of similar standard item auctions ending 5 minutes before the specified auction started |
| F_AVG_SP_IN_5MI | Average closing price of similar standard item auctions ending 5 minutes before the specified auction started |
| F_STD_SP_IN_5MI | Std. Dev. of the closing prices of similar standard item auctions ending 5 minutes before the specified auction started |
| F_MAX_SP_IN_30MI | Maximum closing price of similar standard item auctions ending 30 minutes before the specified auction started |
| F_MIN_SP_IN_30MI | Minimum closing price of similar standard item auctions ending 30 minutes before the specified auction started |
| F_AVG_SP_IN_30MI | Average closing price of similar standard item auctions ending 30 minutes before the specified auction started |
| F_STD_SP_IN_30MI | Std. Dev. of the closing prices of similar standard item auctions ending 30 minutes before the specified auction started |
| F_MAX_SP_IN_1HR | Maximum closing price of similar standard item auctions ending 1 hour before the specified auction started |
| F_MIN_SP_IN_1HR | Minimum closing price of similar standard item auctions ending 1 hour before the specified auction started |
| F_AVG_SP_IN_1HR | Average closing price of similar standard item auctions ending 1 hour before the specified auction started |
| F_STD_SP_IN_1HR | Std. Dev. of the closing prices of similar standard item auctions ending 1 hour before the specified auction started |
| F_MAX_SP_IN_2HR | Maximum closing price of similar standard item auctions ending 2 hours before the specified auction started |
| F_MIN_SP_IN_2HR | Minimum closing price of similar standard item auctions ending 2 hours before the specified auction started |
| F_AVG_SP_IN_2HR | Average closing price of similar standard item auctions ending 2 hours before the specified auction started |
| F_STD_SP_IN_2HR | Std. Dev. of the closing prices of similar standard item auctions ending 2 hours before the specified auction started |
| F_MAX_SP_IN_4HR | Maximum closing price of similar standard item auctions ending 4 hours before the specified auction started |
| F_MIN_SP_IN_4HR | Minimum closing price of similar standard item auctions ending 4 hours before the specified auction started |
| F_AVG_SP_IN_4HR | Average closing price of similar standard item auctions ending 4 hours before the specified auction started |
| F_STD_SP_IN_4HR | Std. Dev. of the closing prices of similar standard item auctions ending 4 hours before the specified auction started |
| F_MAX_SP_IN_8HR | Maximum closing price of similar standard item auctions ending 8 hours before the specified auction started |
| F_MIN_SP_IN_8HR | Minimum closing price of similar standard item auctions ending 8 hours before the specified auction started |
| F_AVG_SP_IN_8HR | Average closing price of similar standard item auctions ending 8 hours before the specified auction started |
| F_STD_SP_IN_8HR | Std. Dev. of the closing prices of similar standard item auctions ending 8 hours before the specified auction started |
| F_MAX_SP_IN_12HR | Maximum closing price of similar standard item auctions ending 12 hours before the specified auction started |
| F_MIN_SP_IN_12HR | Minimum closing price of similar standard item auctions ending 12 hours before the specified auction started |
| F_AVG_SP_IN_12HR | Average closing price of similar standard item auctions ending 12 hours before the specified auction started |
| F_STD_SP_IN_12HR | Std. Dev. of the closing prices of similar standard item auctions ending 12 hours before the specified auction started |
| F_MAX_SP_IN_24HR | Maximum closing price of similar standard item auctions ending 1 day before the specified auction started |
| F_MIN_SP_IN_24HR | Minimum closing price of similar standard item auctions ending 1 day before the specified auction started |
| F_AVG_SP_IN_24HR | Average closing price of similar standard item auctions ending 1 day before the specified auction started |
| F_STD_SP_IN_24HR | Std. Dev. of the closing prices of similar standard item auctions ending 1 day before the specified auction started |
| F_MAX_SP_IN_48HR | Maximum closing price of similar standard item auctions ending 2 days before the specified auction started |
| F_MIN_SP_IN_48HR | Minimum closing price of similar standard item auctions ending 2 days before the specified auction started |
| F_AVG_SP_IN_48HR | Average closing price of similar standard item auctions ending 2 days before the specified auction started |
| F_STD_SP_IN_48HR | Std. Dev. of the closing prices of similar standard item auctions ending 2 days before the specified auction started |
| F_MAX_SP_IN_60HR | Maximum closing price of similar standard item auctions ending 2.5 days before the specified auction started |
| F_MIN_SP_IN_60HR | Minimum closing price of similar standard item auctions ending 2.5 days before the specified auction started |
| F_AVG_SP_IN_60HR | Average closing price of similar standard item auctions ending 2.5 days before the specified auction started |
| F_STD_SP_IN_60HR | Std. Dev. of the closing prices of similar standard item auctions ending 2.5 days before the specified auction started |
| F_MAX_SP_IN_240HR | Maximum closing price of similar standard item auctions ending 10 days before the specified auction started |
| F_MIN_SP_IN_240HR | Minimum closing price of similar standard item auctions ending 10 days before the specified auction started |
| F_AVG_SP_IN_240HR | Average closing price of similar standard item auctions ending 10 days before the specified auction started |
| F_STD_SP_IN_240HR | Std. Dev. of the closing prices of similar standard item auctions ending 10 days before the specified auction started |
| F_MAX_SP_ALL | Maximum closing price of similar standard item auctions (in stored history) ending before the specified auction started |
| F_MIN_SP_ALL | Minimum closing price of similar standard item auctions (in stored history) ending before the specified auction started |
| F_AVG_SP_ALL | Average closing price of similar standard item auctions (in stored history) ending before the specified auction started |

TABLE 8-continued

Similar Standard Auction Closing Price Information

| | |
|---|---|
| F_STD_SP_ALL | Std. Dev. of the closing prices of similar standard item auctions (in stored history) ending before the specified auction started |

TABLE 9

Similar Standard Auction Starting Price Information

| | |
|---|---|
| F_MAX_SA_CURRENT | Maximum starting price of similar standard item auctions open when the specified auction started |
| F_MIN_SA_CURRENT | Minimum starting price of similar standard item auctions open when the specified auction started |
| F_AVG_SA_CURRENT | Average starting price of similar standard item auctions open when the specified auction started |
| F_STD_SA_CURRENT | Standard deviation of the starting prices of similar standard item auctions open when the specified auction started |
| F_MAX_SA_IN_5MI | Maximum starting price of similar standard item auctions ending 5 minutes before the specified auction started |
| F_MIN_SA_IN_5MI | Minimum starting price of similar standard item auctions ending 5 minutes before the specified auction started |
| F_AVG_SA_IN_5MI | Average starting price of similar standard item auctions ending 5 minutes before the specified auction started |
| F_STD_SA_IN_5MI | Std. Dev. of the starting prices of similar standard item auctions ending 5 minutes before the specified auction started |
| F_MAX_SA_IN_30MI | Maximum starting price of similar standard item auctions ending 30 minutes before the specified auction started |
| F_MIN_SA_IN_30MI | Minimum starting price of similar standard item auctions ending 30 minutes before the specified auction started |
| F_AVG_SA_IN_30MI | Average starting price of similar standard item auctions ending 30 minutes before the specified auction started |
| F_STD_SA_IN_30MI | Std. Dev. of the starting prices of similar standard item auctions ending 30 minutes before the specified auction started |
| F_MAX_SA_IN_1HR | Maximum starting price of similar standard item auctions ending 1 hour before the specified auction started |
| F_MIN_SA_IN_1HR | Minimum starting price of similar standard item auctions ending 1 hour before the specified auction started |
| F_AVG_SA_IN_1HR | Average starting price of similar standard item auctions ending 1 hour before the specified auction started |
| F_STD_SA_IN_1HR | Std. Dev. of the starting prices of similar standard item auctions ending 1 hour before the specified auction started |
| F_MAX_SA_IN_2HR | Maximum starting price of similar standard item auctions ending 2 hours before the specified auction started |
| F_MIN_SA_IN_2HR | Minimum starting price of similar standard item auctions ending 2 hours before the specified auction started |
| F_AVG_SA_IN_2HR | Average starting price of similar standard item auctions ending 2 hours before the specified auction started |
| F_STD_SA_IN_2HR | Std. Dev. of the starting prices of similar standard item auctions ending 2 hours before the specified auction started |
| F_MAX_SA_IN_4HR | Maximum starting price of similar standard item auctions ending 4 hours before the specified auction started |
| F_MIN_SA_IN_4HR | Minimum starting price of similar standard item auctions ending 4 hours before the specified auction started |

TABLE 9-continued

Similar Standard Auction Starting Price Information

| | |
|---|---|
| F_AVG_SA_IN_4HR | Average starting price of similar standard item auctions ending 4 hours before the specified auction started |
| F_STD_SA_IN_4HR | Std. Dev. of the starting prices of similar standard item auctions ending 4 hours before the specified auction started |
| F_MAX_SA_IN_8HR | Maximum starting price of similar standard item auctions ending 8 hours before the specified auction started |
| F_MIN_SA_IN_8HR | Minimum starting price of similar standard item auctions ending 8 hours before the specified auction started |
| F_AVG_SA_IN_8HR | Average starting price of similar standard item auctions ending 8 hours before the specified auction started |
| F_STD_SA_IN_8HR | Std. Dev. of the starting prices of similar standard item auctions ending 8 hours before the specified auction started |
| F_MAX_SA_IN_12HR | Maximum starting price of similar standard item auctions ending 12 hours before the specified auction started |
| F_MIN_SA_IN_12HR | Minimum starting price of similar standard item auctions ending 12 hours before the specified auction started |
| F_AVG_SA_IN_12HR | Average starting price of similar standard item auctions ending 12 hours before the specified auction started |
| F_STD_SA_IN_12HR | Std. Dev. of the starting prices of similar standard item auctions ending 12 hours before the specified auction started |
| F_MAX_SA_IN_24HR | Maximum starting price of similar standard item auctions ending 1 day before the specified auction started |
| F_MIN_SA_IN_24HR | Minimum starting price of similar standard item auctions ending 1 day before the specified auction started |
| F_AVG_SA_IN_24HR | Average starting price of similar standard item auctions ending 1 day before the specified auction started |
| F_STD_SA_IN_24HR | Std. Dev. of the starting prices of similar standard item auctions ending 1 day before the specified auction started |
| F_MAX_SA_IN_48HR | Maximum starting price of similar standard item auctions ending 2 days before the specified auction started |
| F_MIN_SA_IN_48HR | Minimum starting price of similar standard item auctions ending 2 days before the specified auction started |
| F_AVG_SA_IN_48HR | Average starting price of similar standard item auctions ending 2 days before the specified auction started |
| F_STD_SA_IN_48HR | Std. Dev. of the starting prices of similar standard item auctions ending 2 days before the specified auction started |
| F_MAX_SA_IN_60HR | Maximum starting price of similar standard item auctions ending 2.5 days before the specified auction started |
| F_MIN_SA_IN_60HR | Minimum starting price of similar standard item auctions ending 2.5 days before the specified auction started |
| F_AVG_SA_IN_60HR | Average starting price of similar standard item auctions ending 2.5 days before the specified auction started |
| F_STD_SA_IN_60HR | Std. Dev. of the starting prices of similar standard item auctions ending 2.5 days before the specified auction started |
| F_MAX_SA_IN_240HR | Maximum starting price of similar standard item auctions ending 10 days before the specified auction started |
| F_MIN_SA_IN_240HR | Minimum starting price of similar standard item auctions ending 10 days before the specified auction started |
| F_AVG_SA_IN_240HR | Average starting price of similar standard item auctions ending 10 days before the specified auction started |
| F_STD_SA_IN_240HR | Std. Dev. of the starting prices of similar standard item auctions ending 10 days before the specified auction started |

TABLE 9-continued

Similar Standard Auction Starting Price Information

| | |
|---|---|
| F_MAX_SA_ALL | Maximum starting price of similar standard item auctions (in stored history) ending before the specified auction started |
| F_MIN_SA_ALL | Minimum starting price of similar standard item auctions (in stored history) ending before the specified auction started |
| F_AVG_SA_ALL | Average starting price of similar standard item auctions (in stored history) ending before the specified auction started |
| F_STD_SA_ALL | Std. Dev. of the starting prices of similar standard item auctions (in stored history) ending before the specified auction started |

TABLE 10

Similar Standard Auction Shipping Amount Information

| | |
|---|---|
| F_MAX_CP_CURRENT | Maximum shipping amount of similar standard item auctions open when the specified auction started |
| F_MIN_CP_CURRENT | Minimum shipping amount of similar standard item auctions open when the specified auction started |
| F_AVG_CP_CURRENT | Average shipping amount of similar standard item auctions open when the specified auction started |
| F_STD_CP_CURRENT | Standard deviation of the shipping amounts of similar standard item auctions open when the specified auction started |
| F_MAX_CP_IN_5MI | Maximum shipping amount of similar standard item auctions ending 5 minutes before the specified auction started |
| F_MIN_CP_IN_5MI | Minimum shipping amount of similar standard item auctions ending 5 minutes before the specified auction started |
| F_AVG_CP_IN_5MI | Average shipping amount of similar standard item auctions ending 5 minutes before the specified auction started |
| F_STD_CP_IN_5MI | Std. Dev. of the shipping amounts of similar standard item auctions ending 5 minutes before the specified auction started |
| F_MAX_CP_IN_30MI | Maximum shipping amount of similar standard item auctions ending 30 minutes before the specified auction started |
| F_MIN_CP_IN_30MI | Minimum shipping amount of similar standard item auctions ending 30 minutes before the specified auction started |
| F_AVG_CP_IN_30MI | Average shipping amount of similar standard item auctions ending 30 minutes before the specified auction started |
| F_STD_CP_IN_30MI | Std. Dev. of the shipping amounts of similar standard item auctions ending 30 minutes before the specified auction started |
| F_MAX_CP_IN_1HR | Maximum shipping amount of similar standard item auctions ending 1 hour before the specified auction started |
| F_MIN_CP_IN_1HR | Minimum shipping amount of similar standard item auctions ending 1 hour before the specified auction started |
| F_AVG_CP_IN_1HR | Average shipping amount of similar standard item auctions ending 1 hour before the specified auction started |
| F_STD_CP_IN_1HR | Std. Dev. of the shipping amounts of similar standard item auctions ending 1 hour before the specified auction started |
| F_MAX_CP_IN_2HR | Maximum shipping amount of similar standard item auctions ending 2 hours before the specified auction started |
| F_MIN_CP_IN_2HR | Minimum shipping amount of similar standard item auctions ending 2 hours before the specified auction started |
| F_AVG_CP_IN_2HR | Average shipping amount of similar standard item auctions ending 2 hours before the specified auction started |

TABLE 10-continued

Similar Standard Auction Shipping Amount Information

| | |
|---|---|
| F_STD_CP_IN_2HR | Std. Dev. of the shipping amounts of similar standard item auctions ending 2 hours before the specified auction started |
| F_MAX_CP_IN_4HR | Maximum shipping amount of similar standard item auctions ending 4 hours before the specified auction started |
| F_MIN_CP_IN_4HR | Minimum shipping amount of similar standard item auctions ending 4 hours before the specified auction started |
| F_AVG_CP_IN_4HR | Average shipping amount of similar standard item auctions ending 4 hours before the specified auction started |
| F_STD_CP_IN_4HR | Std. Dev. of the shipping amounts of similar standard item auctions ending 4 hours before the specified auction started |
| F_MAX_CP_IN_8HR | Maximum shipping amount of similar standard item auctions ending 8 hours before the specified auction started |
| F_MIN_CP_IN_8HR | Minimum shipping amount of similar standard item auctions ending 8 hours before the specified auction started |
| F_AVG_CP_IN_8HR | Average shipping amount of similar standard item auctions ending 8 hours before the specified auction started |
| F_STD_CP_IN_8HR | Std. Dev. of the shipping amounts of similar standard item auctions ending 8 hours before the specified auction started |
| F_MAX_CP_IN_12HR | Maximum shipping amount of similar standard item auctions ending 12 hours before the specified auction started |
| F_MIN_CP_IN_12HR | Minimum shipping amount of similar standard item auctions ending 12 hours before the specified auction started |
| F_AVG_CP_IN_12HR | Average shipping amount of similar standard item auctions ending 12 hours before the specified auction started |
| F_STD_CP_IN_12HR | Std. Dev. of the shipping amounts of similar standard item auctions ending 12 hours before the specified auction started |
| F_MAX_CP_IN_24HR | Maximum shipping amount of similar standard item auctions ending 1 day before the specified auction started |
| F_MIN_CP_IN_24HR | Minimum shipping amount of similar standard item auctions ending 1 day before the specified auction started |
| F_AVG_CP_IN_24HR | Average shipping amount of similar standard item auctions ending 1 day before the specified auction started |
| F_STD_CP_IN_24HR | Std. Dev. of the shipping amounts of similar standard item auctions ending 1 day before the specified auction started |
| F_MAX_CP_IN_48HR | Maximum shipping amount of similar standard item auctions ending 2 days before the specified auction started |
| F_MIN_CP_IN_48HR | Minimum shipping amount of similar standard item auctions ending 2 days before the specified auction started |
| F_AVG_CP_IN_48HR | Average shipping amount of similar standard item auctions ending 2 days before the specified auction started |
| F_STD_CP_IN_48HR | Std. Dev. of the shipping amounts of similar standard item auctions ending 2 days before the specified auction started |
| F_MAX_CP_IN_60HR | Maximum shipping amount of similar standard item auctions ending 2.5 days before the specified auction started |
| F_MIN_CP_IN_60HR | Minimum shipping amount of similar standard item auctions ending 2.5 days before the specified auction started |
| F_AVG_CP_IN_60HR | Average shipping amount of similar standard item auctions ending 2.5 days before the specified auction started |
| F_STD_CP_IN_60HR | Std. Dev. of the shipping amounts of similar standard item auctions ending 2.5 days before the specified auction started |
| F_MAX_CP_IN_240HR | Maximum shipping amount of similar standard item auctions ending 10 days before the specified auction started |

TABLE 10-continued

Similar Standard Auction Shipping Amount Information

| | |
|---|---|
| F_MIN_CP_IN_240HR | Minimum shipping amount of similar standard item auctions ending 10 days before the specified auction started |
| F_AVG_CP_IN_240HR | Average shipping amount of similar standard item auctions ending 10 days before the specified auction started |
| F_STD_CP_IN_240HR | Std. Dev. of the shipping amounts of similar standard item auctions ending 10 days before the specified auction started |
| F_MAX_CP_ALL | Maximum shipping amount of similar standard item auctions (in stored history) ending before the specified auction started |
| F_MIN_CP_ALL | Minimum shipping amount of similar standard item auctions (in stored history) ending before the specified auction started |
| F_AVG_CP_ALL | Average shipping amount of similar standard item auctions (in stored history) ending before the specified auction started |
| F_STD_CP_ALL | Std. Dev. of the shipping amounts of similar standard item auctions (in stored history) ending before the specified auction started |

TABLE 11

Historical Information For No Close Auctions

| | |
|---|---|
| NO_COUNT_CURRENT | Count of failed similar item auctions open when the specified auction started |
| NO_COUNT_IN_5MI | Count of failed similar item auctions ending 5 minutes before the specified auction started |
| NO_COUNT_IN_30MI | Count of failed similar item auctions ending 30 minutes before the specified auction started |
| NO_COUNT_IN_1HR | Count of failed similar item auctions ending 1 hour before the specified auction started |
| NO_COUNT_IN_2HR | Count of failed similar item auctions ending 2 hours before the specified auction started |
| NO_COUNT_IN_4HR | Count of failed similar item auctions ending 4 hours before the specified auction started |
| NO_COUNT_IN_8HR | Count of failed similar item auctions ending 8 hours before the specified auction started |
| NO_COUNT_IN_12HR | Count of failed similar item auctions ending 12 hours before the specified auction started |
| NO_COUNT_IN_24HR | Count of failed similar item auctions ending 1 day before the specified auction started |
| NO_COUNT_IN_48HR | Count of failed similar item auctions ending 2 days before the specified auction started |
| NO_COUNT_IN_60HR | Count of failed similar item auctions ending 2.5 days before the specified auction started |
| NO_COUNT_IN_240HR | Count of failed similar item auctions ending 10 days before the specified auction started |
| NO_COUNT_ALL | Count of failed similar item auctions (in stored history) ending before the specified auction started |

Figure 8:
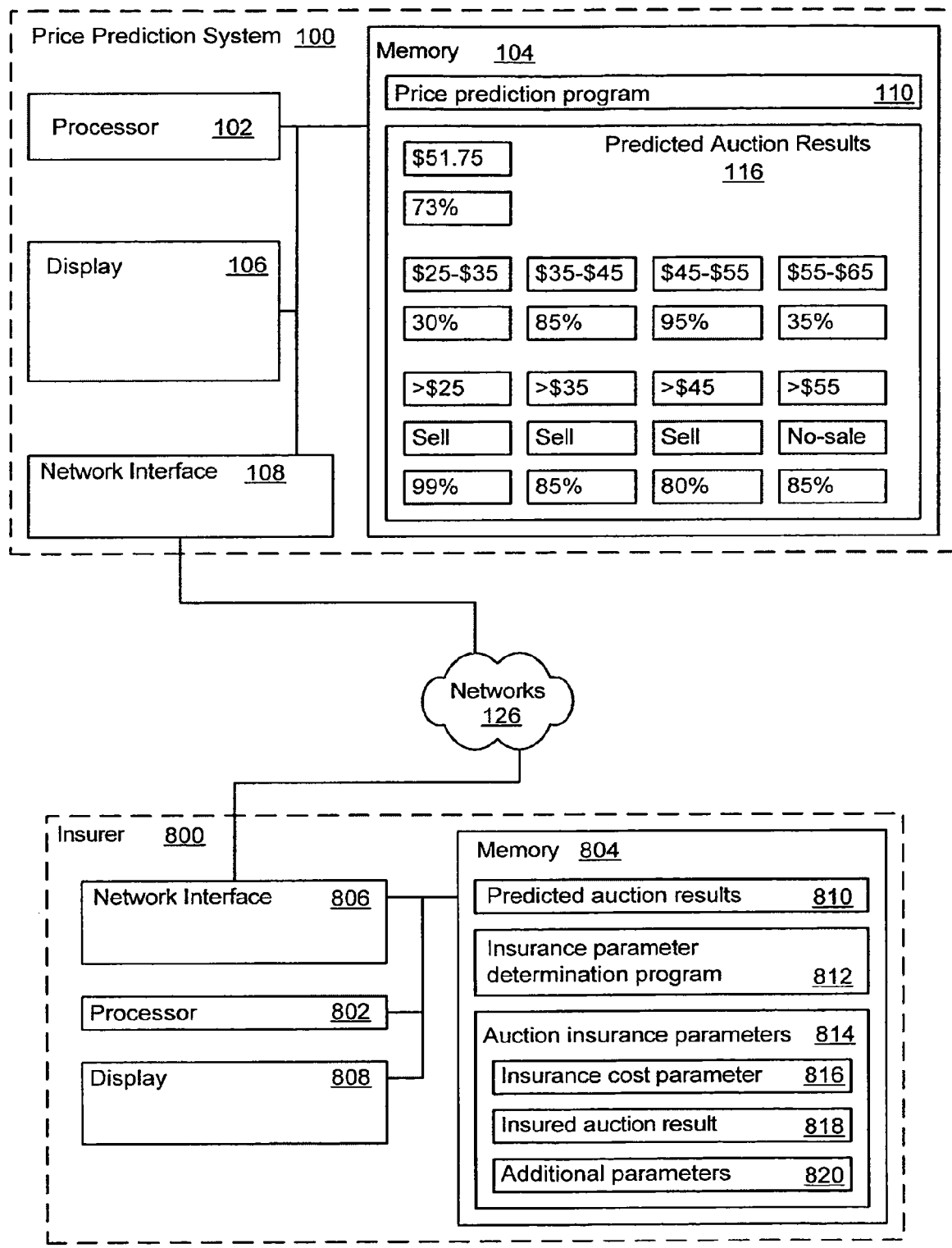
FIG. 8 shows a price prediction system in communication with an auction insurance parameter determination system implemented at an insurer.

Auction insurance is one application of the price prediction technology discussed above. FIG. 8, for example, shows an insurer data processing system 800 ("insurer 800") cooperating with the price prediction system 100 to provide auction insurance. The insurer 800 may include a processor 802 coupled to a memory 804, network interface 806, and a display 808.

The memory 804 may hold one or more predicted auction results 810, an insurance parameter determination program 812, and auction insurance parameters 814. The auction insurance parameters 814 may include an insurance cost parameter 816 and an insured auction result 818. Additional insurance parameters 820, such as terms and conditions on an insurance policy, also may be determined or established.

The insurer 800 may obtain any of the predicted auction results 810 from the price prediction system 100, market participants, or other third party systems. The predicted auction results 810 may include one or more end-of-auction prices 402, end-of-auction price rangers 404, and/or end-of-auction price thresholds 406, with associated confidence measures. The predicted auction results 810 may take other forms, however.

The insurance cost parameter 816 may represent a cost, price, or other consideration associated with the insurance. The cost may be a dollar amount that a buyer, seller, or other party may pay to buy auction insurance. The auction insurance may insure that an auction item will or will not sell, will or will not reach a specified price, or will or will not reach another end-result specified by the insured auction result parameter 818. For example, a PDA auction may be associated with an insured auction result parameter 818 of "at least $50.00." The insurance cost parameter may then represent a cost to the seller for the insurance, for example $1.00. In this example, the buyer may pay $1.00 to purchase insurance that the PDA will sell for at least $50.00.

The insured auction result may specify one or more auction characteristics. For example, the insured auction result may specify whether the item will sell or not sell, may specify a final selling price, a greatest bid, an auction duration, or other auction characteristic. In the example above, the insured auction result was that the PDA would sell for at least $50.00. As another example, an insured auction result may be that the PDA will sell for a specified buy-it-now price within two days of the start of the auction.

The insurer 800 may communicate with the price prediction system 100 over the networks 126. For example, when the price prediction system 100 has obtained the predicted auction results 116 for an online auction, the price prediction system 100 may communicate some or all of the predicted auction results 116 to the insurer 800 for analysis. The particular auction results 116 communicated to the insurer 800 may be pre-configured or negotiated prior to transfer between the insurer 800 or price prediction system 100. The insurer 800 may determine the auction insurance parameters 814 and communicate the parameters 814 back to the price prediction system 100, or to a third party such as the market participant 128.

In other embodiments, the insurer 800 may receive predicted auction results from multiple price prediction systems 100. Each of the price prediction systems 100 may be independently operated and may provide independently determined predictions of any type for auction results. Similarly, one or more price prediction systems 100 may communicate their predicted auction results to one or more insurers 800. Each insurer 800 may be independently operated and may provide independently determined auction insurance parameters for review by the price prediction systems 100 or other third parties.

Figure 9:
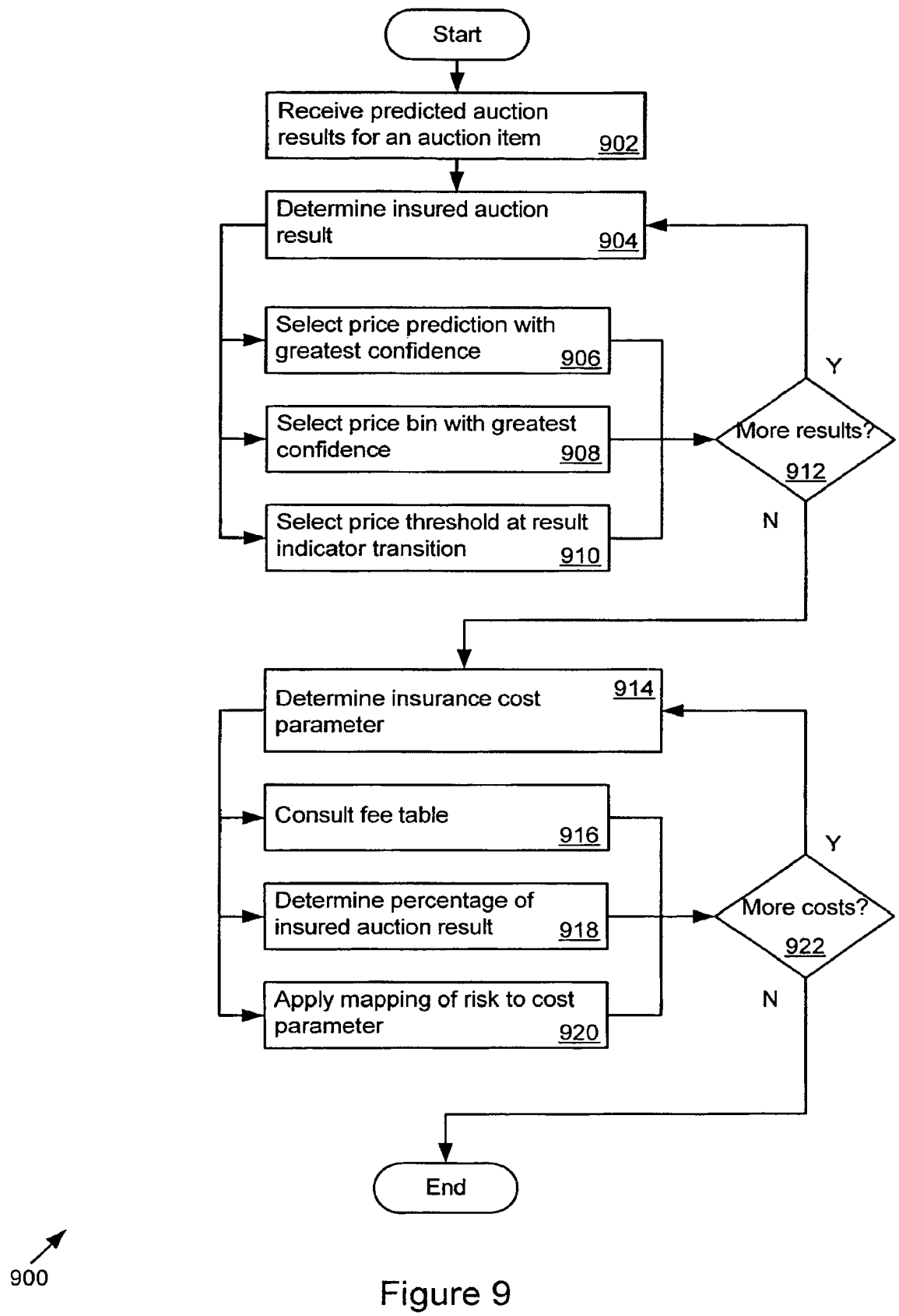
FIG. 9 shows the acts that may be taken to determine auction insurance parameters.

FIG. 9 summaries the acts 900 that the insurance parameter determination program 812 may take to determine the auction insurance parameters 814. The program 812 may receive predicted auction results such as price predictions, price bins, price thresholds, and associated confidence measures for an auction item (Act 902).

In one implementation, the program 812 may determine one or more insured auction results (Act 904). For example, the program 812 may select, from the predicted auction results, the price prediction 408 with the greatest confidence measure 410 (Act 906). Alternatively or additionally, the program 812 may select the price bin 412 with the greatest confidence measure 414 (Act 908). As another example, the program 812 may select the price threshold 406 at which an associated result indictor 418 transitions (e.g., from a "Sell"

to a "No Sell"), a price threshold 406 with the greatest confidence measure, or a price threshold 406 with at least a pre-determine confidence measure (e.g., at least 90%) (Act 910).

The program 812 may select insured auction results directly from the predicted auction results received from the price prediction systems 100. However in other implementations, the program 812 may generate additional auction results to choose from. For example, the program 812 may derive averaged, interpolated, or curve-fit, or other statistically derived auction results from one or more types of predicted auction results. The program 812 may select insured auction results from any additional auction results obtained in any manner.

In some implementations, the program 812 may determine a single insured auction result (e.g., the PDA will sell for at least $50.00). However, the program 812 may also determine multiple insured auction results. Accordingly, the program 812 may determine as many additional insured auction results as desired, requested, or configured (Act 912). For example, a local configuration file or third party insurance request (e.g., received over the networks 126) may instruct the program 812 to return a selected number of insured auction results. A third party may receive the insured auction results, and select from them to insure the sale of any auction item.

The program 812 may also determine one or more insurance cost parameters (Act 914). For example, the program 812 may consult a fee table stored in the memory 804 (Act 916). The fee table may include pre-defined costs associated confidence measures, insured auction results, or other parameters. For example, the fee table may establish increasing insurance cost with lower confidence measures and/or higher insured auction results.

In another implementation, the program 812 may determine an insurance cost as a function of the insured auction result (Act 918). In one implementation, the function may be one to ten percent (1-10%) of the maximum value of the insured auction result. For example, when a price bin 412 is determined as the insured auction result, the insurance cost may be determined as one percent (1%) of the upper value bounding the bin. As another example, the insurance cost may be determined as two percent (2%) of the upper bound of a price threshold 406.

The program 812 also may determine the insurance cost parameter by evaluating a mapping function (Act 920). The mapping function may map risk to the insurance cost parameter, may map a desired profit to the insurance cost parameter, or may implement other mapping functions. For example, the mapping function may establish higher insurance costs as the risk faced by the insurer increases. The insurer may employ any insurance risk model to establish the insurance cost parameter. Alternatively, the mapping function may set insurance costs to meet a desired profit per insurance policy, over time, or according to other criteria.

The program 812 may determine the insurance cost parameter in other manners. For example, the program 812 may charge a fixed fee (e.g., $1.50) for any auction insurance. As another example, the program 812 may determine the insurance cost parameter as a fixed fee plus a modifier based on factors such as seller or buyer feedback, auction, price prediction, or insurance system surcharges for determining and providing insurance options to a market participant, or other factors. For example, the program 812 may establish a lower insurance cost parameter for buyers and seller feedback exceeding a pre-determined threshold.

Figure 10:
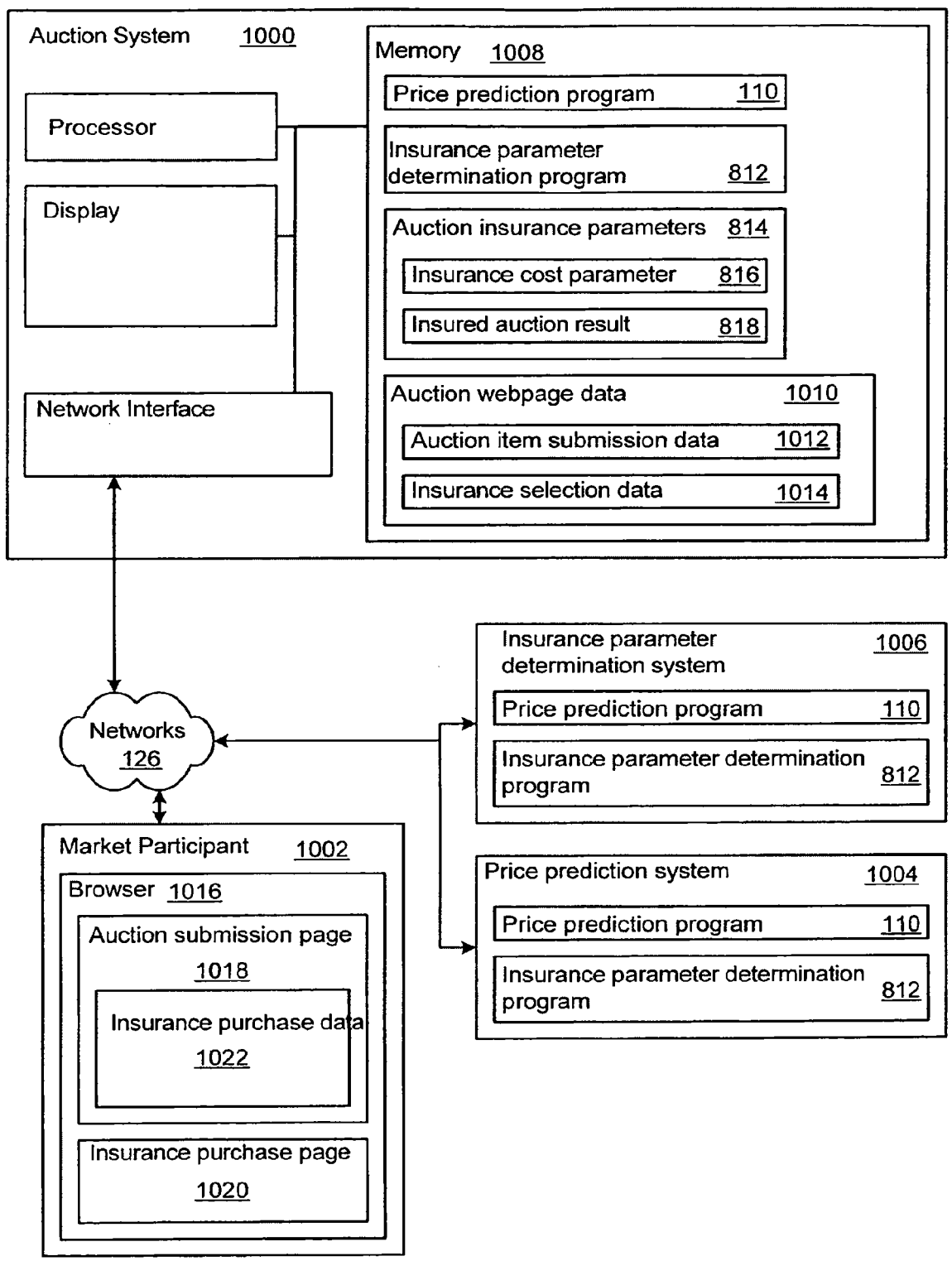
FIG. 10 shows entities that may interact to provide insured online auctions.

FIG. 10 shows data processing systems that may interact to determine, present, and purchase auction insurance. FIG. 10 shows an auction system 1000, a market participant 1002, a price prediction system 1004, and an insurance parameter determination system 1006. The systems 1000-1006 may communicate with one another over one or more networks 126.

The auction system 1000 may represent one or more data processing systems implementing an online auction system. The auction system 1000 may itself perform price prediction and offer auction insurance. To that end, the auction system 1000 may include a memory 1008 that holds a price prediction program 110 and an insurance parameter determination program 812.

The auction system 1000 may establish auction webpage data 1010 in the memory 1008. The auction webpage data 1010 may include auction item submission data 1012 and insurance selection data 1014. The auction item submission data 1012 may represent text, graphics, html code, and/or user interface elements that the market participant 1002 may interact with to establish an online auction for a given auction item. The insurance selection data 1014 may represent the text, graphics, html code, and/or user interface elements that the market participant 1002 (or other third party) may interact with to purchase insurance for the online auction. The insurance selection data 1014 may include or represent one or more auction insurance parameters 814.

Any of the price prediction, insurance, or web page creation and submission functions may take place in whole or in part at any of the systems 1000-1006. For example, the auction system 1000 may communicate auction characteristic data to one or more price prediction systems 1004. The price prediction systems 1004 may determine predicted auction results 116 and/or auction insurance parameters 814. Alternatively, the market participant 1002 may include programs that determine predicted auction results and associated auction insurance parameters. The programs may be provided by an auction system, insurer, or other third party.

Similarly, the auction system 1000 may communication auction characteristic data to one or more insurance parameter determination systems 1006. The insurance parameter determination systems 1006 may determine predicted auction results 116 and/or auction insurance parameters 814. Any of the systems 1000-1006 may communication whole or partial price prediction and/or insurance parameter determination results, or web page data to any other system 1000-1006.

For example, the market participant 1002 may enter auction characteristic data as explained above. The auction system 1000 may communicate the auction characteristic data to the price prediction system 1004. The price prediction system 1004 may then communicate predicted auction results to the insurance parameter determination system 1006. The insurance parameter determination system 1006 may communicate the auction insurance parameters to the auction system 1000. The auction system 1000 may then prepare the auction webpage data 1010 with the insurance selection data 1014 for the market participant 1002.

The market participant 1002 may represent an auction item seller, buyer, or other third party. The market participant 1002 may execute a communication program such as a web browser program 1016. The web browser program 1016 may display an auction submission page 1018 and/or an insurance purchase page 1020. The insurance purchase page 1020 may be an independent web page, may be integrated with the auction submission page 1018 as insurance purchase data 1022, or may be integrated with other web pages.

The auction submission page 1018 may include the text, graphics, html code, and/or user interface elements established by the auction item submission data 1012, but may also include other data. The market participant 1002 may interact with the auction submission page 1018 to submit auction data (e.g., auction item characteristics), initiate the online auction, or otherwise interact with the auction system 1000.

The insurance purchase page 1020 and/or insurance purchase data 1022 may present the insurance selection data 1014. The market participant 1002 may interact with the insurance purchase page 1020 and/or insurance purchase data to review and select insurance offerings from one or more insurers, to select insurance for an auction item sale, purchase, or other transaction, and to purchase auction insurance. The market participant 1002 may provide credit card, bank account, debit account, PayPal™ account data, or any other payment information to the systems 1000-1006 to pay for the auction insurance.

Figure 11:
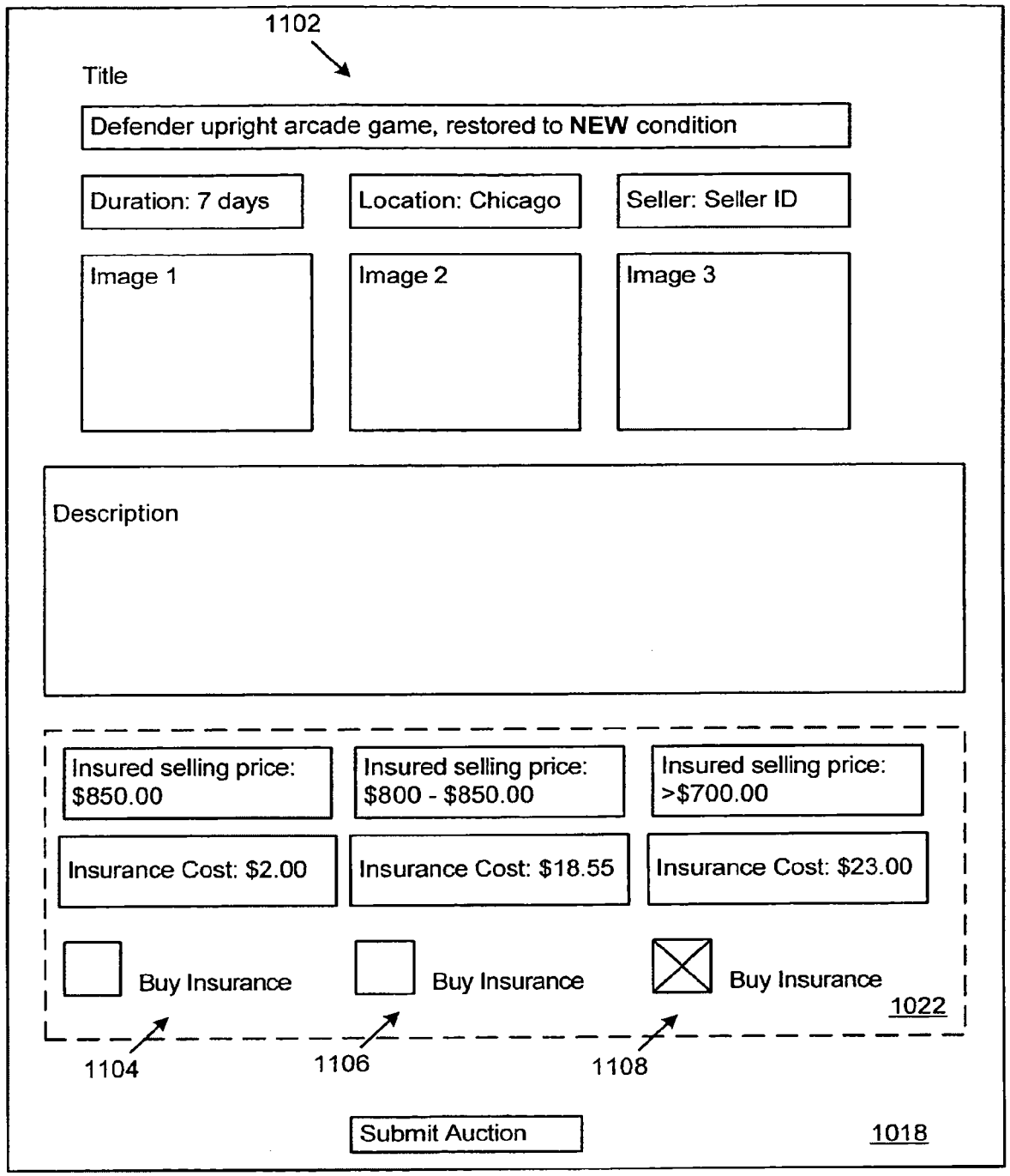
FIG. 11 shows an auction submission page.

In FIG. 11, a browser window shows an auction submission page 1018. The auction submission page 1018 may include auction item characteristics 1102 such as the auction title, duration, location, and images. The auction submission page 1018 may also include the insurance purchase data 1022.

The insurance purchase data 1022 may be based on auction insurance parameters obtained from one or more third parties. In the example shown in FIG. 11, the insurance purchase data 1022 provides the market participant 1002 with a choice of three insurance policies 1104, 1106, and 1108. Under the first policy 1104, the market participant 1002 may purchase, for $2.00, insurance that the auction item will sell for $850.00. Under the second policy 1106, the market participant 1002 may purchase, for $18.55, insurance that the auction item will sell for between $800.00 and $850.00. Under the third policy 1108, the market participant 1002 may purchase, for $23.00, insurance that the auction item will sell for at least $700.00.

The insurer may specify, as an insurance parameter or otherwise, under what conditions and how much the purchaser may collect based upon the purchased insurance. For example, when the insurance policy 1108 is purchased, the insurer may pay the purchaser the difference between the final price of the auction item and $700.00, when the final price is less than $700.00. As another example, under insurance policies 1104 or 1106, the insurer may pay the purchaser a preselected dollar amount if the final price of the auction item is not $850.00 or is less than $800.00, respectively.

As explained above, the market participant 1002 may purchase insurance via the auction submission page 1018 before the auction starts. The market participant 1002 may instead purchase auction insurance at other times, including after the auction starts. More generally, the market participant 1002 may interact with an insurance purchase interface to select and purchase insurance for an auction. The insurance purchase interface may be an web browser page with user interface elements such as the auction submission page 1018, may be a web browser page independent of the auction submission process, may be an electronic form, non-electronic form, email exchange between the market participant 1002 and the insurer, telephone exchange between the market participant 1002 and the insurer, or other interface.

When the market participant 1002 purchases insurance, the market participant 1002 may communicate the selected insurance parameters, payment information, and purchaser identifying information to any third party, such as the insurer 800. The insurer 800 may record and track insurance policies purchased, associated auctions, and may determine and track auction results.

Figure 12:
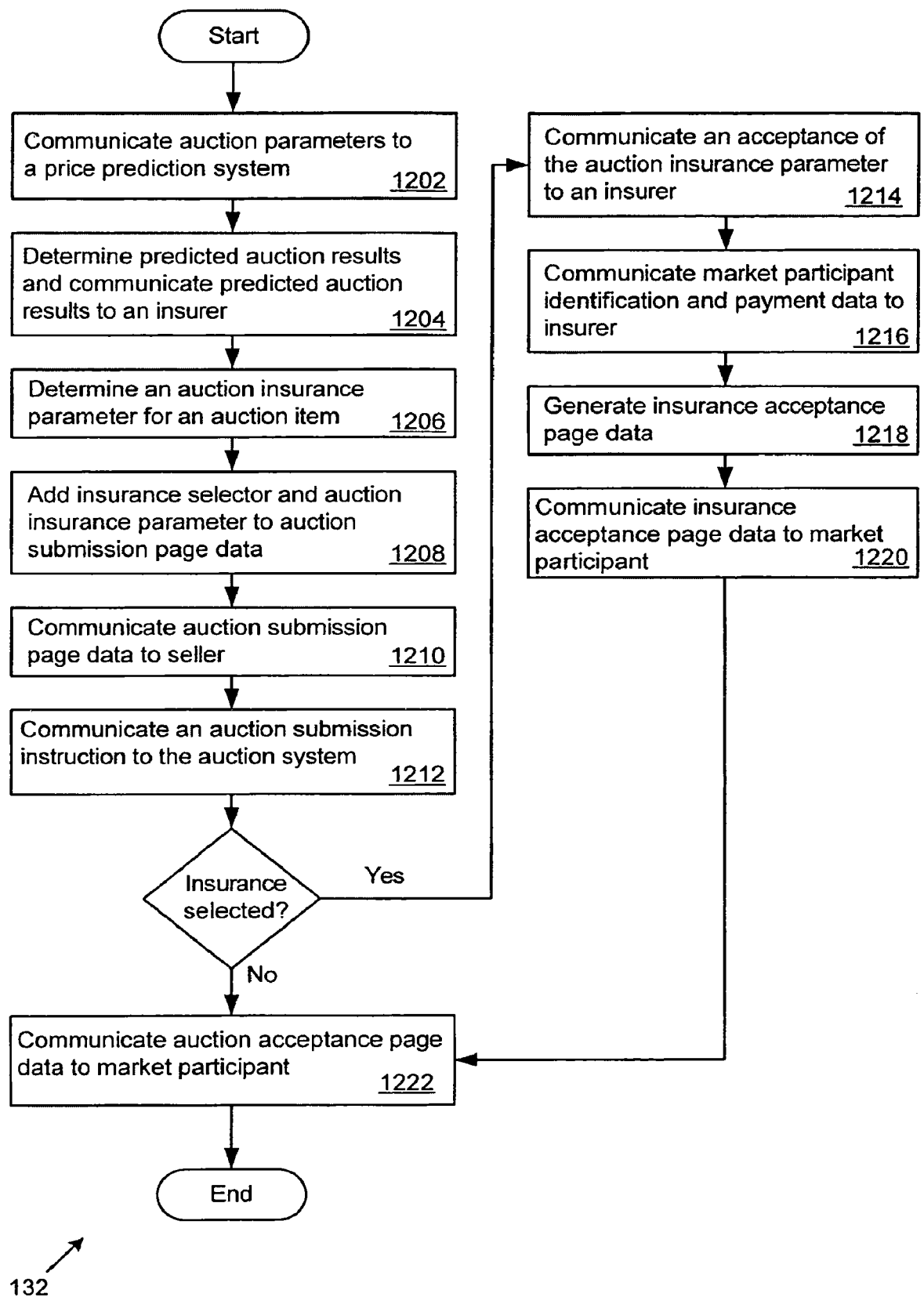
FIG. 12 shows the acts that may be taken to provide insurance for an online auction.

FIG. 12 shows the acts that may be taken to provide online auction insurance. Auction parameters, including item characteristics, may be communicated to a price prediction system 1004 (Act 1202). The price prediction system 1004 may generate predicted auction results and communicate the predicted auction results to an insurance parameter determination system 1006 (Act 1204). The insurance parameter determination system 1006 may determine one or more auction insurance parameters (Act 1206).

An insurer, auction system, market participant, or other system may add auction insurance parameters and an auction insurance selector (e.g., a selection button) to an auction submission web page, stand alone web page, or other web page (Act 1208). The web page data may be communicated to a market participant (Act 1210). To initiate an auction, the market participant may communicate an auction submission instruction to an auction system or other third party (Act 1212). The auction submission instruction may arise from any input provided by the market participant, such as a mouse click on a "Submit" user interface element, keystroke, or other input.

If auction insurance is selected, the market participant may communicate acceptance of one or more auction insurance parameters to an insurer (Act 1214). The market participant may also communicate identification and payment information to the insurer (Act 1216). The insurer may generate insurance acceptance data, for example, in the form of a web page with an acceptance message, terms and conditions, and other information. (Act 1218). The insurer may then communicate the acceptance page data to the market participant (Act 1220). Whether or not insurance is selected, the auction system may communicate an auction acceptance page to the market participant (Act 1222) and initiate the online auction.

It is therefore intended that the foregoing detailed description be regarded as illustrative rather than limiting, and that it be understood that it is the following claims, including all equivalents, that are intended to define the spirit and scope of this invention.

The invention claimed is:

1. An auction result prediction method, the method comprising:
   obtaining a participant specified characteristic for a first auction item;
   obtaining historical auction data;
   providing the participant specified characteristic and the historical auction data to a result prediction program executing on a computer;
   determining, by a processor in the computer that executes the result prediction program, a predicted auction result comprising:
   price ranges; and
   price range confidence measures, each specifying a confidence for a corresponding price range among the price ranges;
   providing, by the computer, the price ranges and the price range confidence measures to a result selector;
   receiving from the result selector a result prediction determined from the price ranges and the confidence measures;
   providing, by the processor, the predicted auction result to an insurance parameter determination program;
   executing, by the processor, the insurance parameter determination program:
      obtain an insured auction result; and
      determine an insurance cost for the insured auction result based at least in part on the predicted auction result.

2. The method of claim 1, where obtaining a participant specified characteristic comprises obtaining an auction item image, title, shipping characteristic, an auction item newness characteristic, an auction item category characteristic, an auction item identifier, a seller-specified auction item characteristic, a seller-specified auction characteristic, a participant specified seller characteristic, or any combination thereof.

3. The method of claim 1, where obtaining historical auction data comprises obtaining a prior auction price, prior auction title, prior auction duration characteristic, historical auction data for additional auction items similar to the first auction item, or any combination thereof.

4. The method of claim 1, where the predicted auction result further comprises multiple end-of-auction price thresholds and associated result indicators, and where the result prediction is further determined from the multiple end-of-auction price thresholds and result indicators.

5. The method of claim 4, where the predicted auction result further comprises price threshold confidence measures that specify confidences for the end-of- auction price thresholds, and where the result prediction is further determined from the price threshold confidence measures.

6. The method of claim 1, where receiving a result prediction comprises receiving a price prediction at which the result indicators transition from 'Sell' to 'No Sell'.

7. The method of claim 1, further comprising providing to the result prediction program a participant-provided configuration setting that determines a type of the result prediction for the result selector to return.

8. The method of claim 1, where one at least one of the price ranges comprises a predicted end-of-auction price range for the first auction item.

9. The method of claim 1, further comprising:
generating, by the processor, auction webpage data for the first auction item, the auction webpage data comprising:
auction item submission data for establishing an online auction for the first auction item; and
insurance selection data defining an insurance offering for purchasing insurance for the online auction at the insurance cost for the insured auction result; and
receiving, from a market participant, an insurance offering selection of the insurance offering and an auction submission instruction for the online auction, and responsively initiating the online auction insured by the insurance offering.

10. An auction result prediction system comprising:
a memory comprising:
a participant specified characteristic for a first auction item; historical auction data;
a result prediction program stored in the memory that when executed by the processor cause the processor to:
determine a predicted auction result comprising: price ranges; and
price range confidence measures, each specifying a confidence for a corresponding price range among the price ranges;
a result selector, executed by the processor, configured to:
receive the price ranges and the price range confidence measures; and
determine a result prediction from the price ranges and the price range confidence measures;
an insurance parameter determination program, executed by the processor:
receive the predicted auction result;
determine an insured auction result, and
determine an insurance cost for the insured auction result based at least in part on the predicted auction result.

11. The system of claim 10, the participant specified characteristic comprising: an auction item image, title, shipping characteristic, an auction item newness characteristic, an auction item category characteristic, an auction item identifier, a seller-specified auction item characteristic, a seller-specified auction characteristic, a participant specified seller characteristic, or any combination thereof.

12. The system of claim 10, the historical auction data comprising: a prior auction price, prior auction title, prior auction duration characteristic, historical auction data for additional auction items similar to the first auction item, or any combination thereof.

13. The system of claim 10, where the predicted auction result further comprises multiple end-of-auction price thresholds and associated result indicators, and where the result prediction is further determined from the multiple end-of-auction price thresholds and result indicators.

14. The system of claim 13, where the predicted auction result further comprises price threshold confidence measures that specify confidences for the end-of-auction price thresholds, and where the result prediction is further determined from the price threshold confidence measures.

15. The system of claim 10, where the result prediction comprises a price prediction at which the result indicators transition from 'Sell' to 'No Sell'.

16. The system of claim 10, the result prediction program further configured to receive a participant-provided configuration setting that determines a type of the result prediction for the result selector to return.

17. The system of claim 10, where one at least one of the price ranges comprises a predicted end-of-auction price range for the first auction item.

18. The system of claim 10, further comprising:
auction webpage data, generated by the processor, for the first auction item, the auction webpage data comprising:
auction item submission data used to establish an online auction for the first auction item; and
insurance selection data defining an insurance offering for purchasing insurance for the online auction at the insurance cost for the insured auction result; and
an insurance offering selection of the insurance offering and an auction submission instruction for the online auction that initiate the online auction insured by the insurance offering, where the insurance offering selection and the auction submission instruction are received from a market participant.

19. An auction result prediction product comprising:
a machine readable medium;
result prediction instructions stored on the medium that when executed by a processor cause the processor to:
obtain a participant specified characteristic for a first auction item; obtain historical auction data;
determine a predicted auction result comprising:
price ranges; and
price range confidence measures, each specifying a confidence for a corresponding price range among the price ranges;
a result selector stored on the medium that when executed by a processor cause the processor to:
receive the price ranges and the price range confidence measures; and
determine a result prediction from the price ranges, the price range confidence measures;
insurance parameter determination instructions stored on the medium that when executed by a processor cause the processor to:

receive the predicted auction result;

determine an insured auction result, and determine an insurance cost for the insured auction result based at least in part on the predicted auction result.

20. The product of claim 19, where the participant specified characteristic comprises: an auction item image, title, shipping characteristic, an auction item newness characteristic, an auction item category characteristic, an auction item identifier, a seller-specified auction item characteristic, a seller-specified auction characteristic, a participant specified seller characteristic, or any combination thereof.

21. The product of claim 19, where the historical auction data comprises: a prior auction price, prior auction title, prior auction duration characteristic, historical auction data for additional auction items similar to the first auction item, or any combination thereof.

22. The product of claim 19, where the predicted auction result further comprises multiple end-of-auction price thresholds and associated result indicators, and where the result prediction is further determined from the multiple end-of-auction price thresholds and result indicators.

23. The product of claim 22, where the predicted auction result further comprises price threshold confidence measures that specify confidences for the end-of-auction price thresholds, and where the result prediction is further determined from the price threshold confidence measures.

24. The product of claim 19, where the result prediction comprises a price prediction at which the result indicators transition from 'Sell' to 'No Sell'.

25. The product of claim 19, where the result prediction instructions are further configured to receive a participant-provided configuration setting that determines a type of the result prediction that the result selector to returns.

26. The product of claim 19, where one at least one of the price ranges comprises a predicted end-of-auction price range for the first auction item.

27. The product of claim 19, further comprising:

auction webpage data, generated by the processor, for the first auction item, the auction webpage data comprising:

auction item submission data used to establish an online auction for the first auction item; and insurance selection data defining an insurance offering for purchasing insurance for the online auction at the insurance cost for the insured auction result; and an insurance offering selection of the insurance offering and an auction submission instruction for the online auction received from a market participant, where the insurance offering selection and the auction submission instruction initiate the online auction insured by the insurance offering.

* * * * *

UNITED STATES PATENT AND TRADEMARK OFFICE
CERTIFICATE OF CORRECTION

PATENT NO. : 7,904,378 B2  
APPLICATION NO. : 12/816079  
DATED : March 8, 2011  
INVENTOR(S) : Rayid Ghani et al.

Page 1 of 1

It is certified that error appears in the above-identified patent and that said Letters Patent is hereby corrected as shown below:

<u>On the Title Page</u>

Left column, item (75), after "Rayid Ghani, Chicago, IL" replace "(US)" with --(UK)--.

Signed and Sealed this
Sixteenth Day of August, 2011

David J. Kappos
*Director of the United States Patent and Trademark Office*